US012810563B2

(12) United States Patent
Hallgarten et al.

(10) Patent No.: US 12,810,563 B2
(45) Date of Patent: Nov. 24, 2026

(54) TECHNIQUES FOR DETERMINING TASKS BASED ON DATA FROM A SENSOR SET OF AN EXTENDED-REALITY SYSTEM USING A SENSOR SET AGNOSTIC CONTRASTIVELY-TRAINED LEARNING MODEL, AND SYSTEMS AND METHODS OF USE THEREOF

(71) Applicant: Meta Platforms Technologies, LLC, Menlo Park, CA (US)

(72) Inventors: Philipp Hallgarten, Redmond, WA (US); Naveen Sendhilnathan, New York, NY (US); Ting Zhang, Santa Clara, CA (US); Tanya Renee Jonker, Seattle, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 85 days.

(21) Appl. No.: 19/053,361

(22) Filed: Feb. 13, 2025

(65) Prior Publication Data

US 2025/0265788 A1 Aug. 21, 2025

Related U.S. Application Data

(60) Provisional application No. 63/554,748, filed on Feb. 16, 2024.

(51) Int. Cl.

| | |
|---|---|
| ***G06T 19/00*** | (2011.01) |
| ***G02B 27/01*** | (2006.01) |
| ***G06F 3/01*** | (2006.01) |

(52) U.S. Cl.
CPC .......... *G06T 19/006* (2013.01); *G02B 27/017* (2013.01); *G06F 3/013* (2013.01); *G06F 3/014* (2013.01)

(58) Field of Classification Search
CPC ..... G06T 19/006; G02B 27/017; G06F 3/013; G06F 3/014
See application file for complete search history.

(56) References Cited

U.S. PATENT DOCUMENTS

| | | | | |
|---|---|---|---|---|
| 11,221,814 | B2 * | 1/2022 | Browy | G06F 3/012 |
| 2023/0074706 | A1 * | 3/2023 | Xiao | G06F 18/213 |
| 2024/0164688 | A1 * | 5/2024 | Asirvatham | A61B 5/327 |
| 2024/0185447 | A1 * | 6/2024 | Brent | G06T 7/70 |

* cited by examiner

*Primary Examiner* — Xin Sheng
(74) *Attorney, Agent, or Firm* — Morgan, Lewis & Bockius LLP

(57) ABSTRACT

Systems and methods of using sensor sets for detecting multiple tasks are disclosed. An example method includes receiving, via a first sensor of the shared sensor set, first data representative of visual intent and receiving, via a second sensor of the shared sensor set, second data representative of a hand input. The method includes determining, using a contrastively-trained model, third data that describes a relationship between the first data and the second data and determining, using a task-inferring model and the third data, a task to be performed at an XR system. The method further includes providing instructions for causing performance of the task at the XR system.

20 Claims, 9 Drawing Sheets

160
Contrastive Training of an Embedding Function

↓

170
Supervised Training of the Models to Predict Task Labels

↓

180
Multi-Task Multi-Sensor Set Inference

TECHNIQUES FOR DETERMINING TASKS BASED ON DATA FROM A SENSOR SET OF AN EXTENDED-REALITY SYSTEM USING A SENSOR SET AGNOSTIC CONTRASTIVELY-TRAINED LEARNING MODEL, AND SYSTEMS AND METHODS OF USE THEREOF

CROSS-REFERENCE TO RELATED APPLICATIONS

This application claims priority to U.S. Prov. App. No. 63/554,748, filed on Feb. 16, 2024, and entitled "Techniques for Determining Tasks Based on Data from a Sensor Set of an Extended-Reality System Using a Sensor Set Agnostic Contrastively-Trained Learning Model, and Systems and Methods of Use Thereof," which is incorporated herein by reference.

TECHNICAL FIELD

This relates generally to techniques for determining a task based on data captured at a shared sensor set of an extended-reality (XR) system, in accordance with some embodiments. The techniques include but are not limited to employing a self-supervised contrastive-learning model to use data from a sensor set to learn embeddings without any labeled data, which leads the model to encode information for multiple purposes, rather than only the piece of information relevant for a single task.

BACKGROUND

The most promising approach for decoding user interaction intent from rich, multidimensional data, such as user gaze, is computational modeling and machine learning. However, previously proposed methodologies have two evident and critical limitations. First, they can only handle data of one specific set of sensors (e.g., a specific handheld controller and eye tracker) and suffer from a drop in performance if data of another set of sensors is used (e.g., transfer to hand-gesture tracking). Second, they are only trained for a single task, such as detecting input recognition errors. Developers need to handle multiple tasks simultaneously and want to enable the use of multiple sets of sensors. For example, for a single application, the system might need to predict if a user is about to interact with the system, predict the endpoint of the hand and gaze motion, and detect a user's gestures. Given that extended-reality (XR) headsets and other head-wearable devices only offer limited computing resources due to weight and power consumption limitations, deploying multiple single-sensor-set single-task models in parallel to accomplish the variety of tasks on XR headsets is infeasible.

As such, there is a need to address one or more of the above-identified challenges. A brief summary of solutions to the issues noted above are described below.

SUMMARY

The methods, systems, and devices described herein allow extended-reality (XR) systems to meet multi-task and multi-sensor set needs in resource-constrained devices, such as XR headsets, by fitting multiple smaller linear models to predict task labels from embeddings in parallel. The methods, systems, and device include a feature extraction mechanism that extracts the embeddings (e.g., gaze and hand tracking) from XR interaction data that can be shared across various XR interaction tasks and sensor sets. The methods, systems, and devices employ a self-supervised contrastive-learning model adapted for use with the sensor data. The contrastive-learning model learns embeddings without any labeled data which leads them to encode information for multiple purposes, rather than only pieces of information relevant for a single task. This allows combining data of various sensor sets, and thus to the contrastive-learning model learns robust features generalizable across sensor sets.

Wearable devices, such as XR headsets, can have limited compute resources due to weight and power consumption limitations, which can make deploying multiple single-sensor sets and single task models in parallel to accomplish this variety of tasks on wearable devise infeasible. Additionally, switching between models to accommodate multiple tasks and sensor sets would incur latency and degrade the user's experience. For example, for a single application, an XR system might need to predict if a user is about to interact with the system, predict the endpoint of an input (e.g., endpoint of a hand and gaze motion), and detect a user's gestures. The systems and methods disclosed herein provide a solution for the above-mentioned drawbacks.

The systems and method disclosed herein can utilize inputs from different sensors to detect user inputs or tasks. The systems and method can use user behavioral data (e.g., eye gaze, hand movements, facial data, etc.) to assist in the determination of a user input or completion of a task, such as selection of a user interface element. The systems and methods disclosed herein use encoders to generate, based on user behavioral data, generalizable multi-purpose embeddings, which enable the use of an efficient multi-task and multi-sensor set architecture that can be deployed on compute and memory constrained platforms, such as wearable devices. In addition to improvements in latency and memory efficiency, the systems and method reduce power consumption and allow the wearable devices to be used longer without charge (and/or without a sustained power source or external batteries) and/or allow the use of all-day always-on wearable devices. The system and method disclosed herein to handle multiple tasks from various sensor sets simultaneously to provide a low-friction real-life solution for detecting user inputs at wearable devices.

The systems and methods disclosed herein can use at least two separate encoders. The encoders learn to model the shared embedding function fθ while a first encoder processes (e.g., encodes) data from a first input modality (e.g., gaze tracking data) and a second encoder processes data from a second input modality (e.g., hand tracking data). In some embodiments, the encoders use a BERT-style transformer encoder as encoder architecture. In some embodiments, the encoder architecture projects the inputs into a higher dimensional space using a position-wise linear layer; adds sinusoidal positional embeddings, prepends a trainable token to the sequence, and passes it through the stack of transformer encoders. In some embodiments, the transformer encoder outputs at the position of the trainable token as encoding for the whole signal, and pass it through an instance normalization layer to obtain hand and gaze embeddings. In some embodiments, the systems and methods disclosed herein, as a proxy, use nonlinear projection heads that consist of two linear layers, separated by a ReLU activation function and a dropout layer, to project these embeddings into a shared embedding space where the contrastive objective function is evaluated, as discussed below. In some embodiments, after the encoder training is finished, the encoder parameters are frozen and remove the nonlinear projection heads. In some embodiments, the embeddings for the respective input modalities are added to obtain one holistic embedding. In some embodiments, the T data-specific (e.g., sensor set- and task specific), are fitted to linear functions in parallel to predict task labels from the holistic embedding.

A non-transitory computer readable storage medium includes instructions to be executed by a computing device (e.g., the computing device may be a portion of an XR system, where the XR system can include a head-worn electronic device, input devices (such as a controller and/or a smart watch capable of detecting biopotential signals to determine gestures to control the XR system), and an intermediary device in communication with the head-worn device and the input devices) while a shared sensor set is available for use with an XR system (e.g., sensors of an XR head-wearable device, sensors of a wrist-wearable device, communicatively coupled sensor, and/or sensors of any other device). The instructions include receiving, via a first sensor of the shared sensor set, first data representative of visual intent (e.g., data indicative of a user's gaze) and receiving, via a second sensor of the shared sensor set, second data representative of a hand input (e.g., hand gestures, controller inputs, etc.). The instructions further include determining, using a contrastively-trained (and sensor set agnostic) model (e.g., a feature extraction mechanism), third data that describes a relationship between the first data and the second data (e.g., relationship between extracted features). The instructions further include determining, using a task-inferring model (e.g., a task solving model that can determine gesture intentions based on the visual intent and hand inputs) and the third data (e.g., a feature extraction mechanism), a task to be performed at the XR system (e.g., at a device of the system). The instructions further include providing instructions for causing performance of the task at the XR system.

Instructions that cause performance of the methods and operations described herein can be stored on a non-transitory computer readable storage medium. The non-transitory computer-readable storage medium can be included on a single electronic device or spread across multiple electronic devices of a system (computing system). A non-exhaustive of list of electronic devices that can either alone or in combination (e.g., a system) perform the method and operations described herein include an extended-reality (XR) headset/glasses (e.g., a mixed-reality (MR) headset or a pair of augmented-reality (AR) glasses as two examples), a wrist-wearable device, an intermediary processing device, a smart textile-based garment, etc. For instance, the instructions can be stored on a pair of AR glasses or can be stored on a combination of a pair of AR glasses and an associated input device (e.g., a wrist-wearable device) such that instructions for causing detection of input operations can be performed at the input device and instructions for causing changes to a displayed user interface in response to those input operations can be performed at the pair of AR glasses. The devices and systems described herein can be configured to be used in conjunction with methods and operations for providing an XR experience. The methods and operations for providing an XR experience can be stored on a non-transitory computer-readable storage medium.

The devices and/or systems described herein can be configured to include instructions that cause the performance of methods and operations associated with the presentation and/or interaction with an extended-reality (XR) headset. These methods and operations can be stored on a non-transitory computer-readable storage medium of a device or a system. It is also noted that the devices and systems described herein can be part of a larger, overarching system that includes multiple devices. A non-exhaustive of list of electronic devices that can, either alone or in combination (e.g., a system), include instructions that cause the performance of methods and operations associated with the presentation and/or interaction with an XR experience include an extended-reality headset (e.g., a mixed-reality (MR) headset or a pair of augmented-reality (AR) glasses as two examples), a wrist-wearable device, an intermediary processing device, a smart textile-based garment, etc. For example, when an XR headset is described, it is understood that the XR headset can be in communication with one or more other devices (e.g., a wrist-wearable device, a server, intermediary processing device) which together can include instructions for performing methods and operations associated with the presentation and/or interaction with an extended-reality system (i.e., the XR headset would be part of a system that includes one or more additional devices). Multiple combinations with different related devices are envisioned, but not recited for brevity.

The features and advantages described in the specification are not necessarily all inclusive and, in particular, certain additional features and advantages will be apparent to one of ordinary skill in the art in view of the drawings, specification, and claims. Moreover, it should be noted that the language used in the specification has been principally selected for readability and instructional purposes.

Having summarized the above example aspects, a brief description of the drawings will now be presented.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

FIGS. 7A 7B, 7C-1, and 7C-2 illustrate example MR and AR systems, in accordance with some embodiments.

Figure 1:
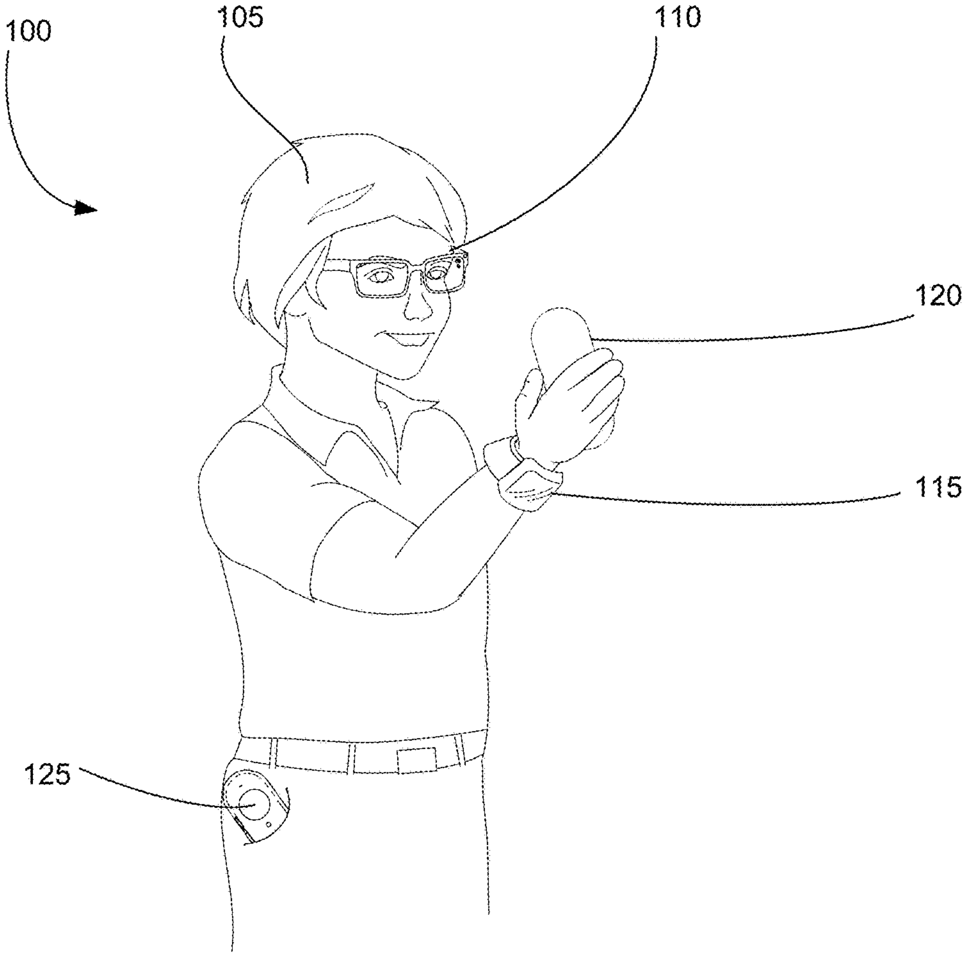
FIG. 1 illustrates an example extended-reality (XR) system, in accordance with some embodiments.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

DETAILED DESCRIPTION

Numerous details are described herein to provide a thorough understanding of the example embodiments illustrated in the accompanying drawings. However, some embodiments may be practiced without many of the specific details, and the scope of the claims is only limited by those features and aspects specifically recited in the claims. Furthermore, well-known processes, components, and materials have not necessarily been described in exhaustive detail so as to avoid obscuring pertinent aspects of the embodiments described herein.

Overview

Embodiments of this disclosure can include or be implemented in conjunction with various types of extended-realities (XRs) such as mixed-reality (MR) and augmented-reality (AR) systems. MRs and ARs, as described herein, are any superimposed functionality and/or sensory-detectable presentation provided by MR and AR systems within a user's physical surroundings. Such MRs can include and/or represent virtual realities (VRs) and VRs in which at least some aspects of the surrounding environment are reconstructed within the virtual environment (e.g., displaying virtual reconstructions of physical objects in a physical environment to avoid the user colliding with the physical objects in a surrounding physical environment). In the case of MRs, the surrounding environment that is presented through a display is captured via one or more sensors configured to capture the surrounding environment (e.g., a camera sensor, time-of-flight (ToF) sensor). While a wearer of an MR headset can see the surrounding environment in full detail, they are seeing a reconstruction of the environment reproduced using data from the one or more sensors (i.e., the physical objects are not directly viewed by the user). An MR headset can also forgo displaying reconstructions of objects in the physical environment, thereby providing a user with an entirely VR experience. An AR system, on the other hand, provides an experience in which information is provided, e.g., through the use of a waveguide, in conjunction with the direct viewing of at least some of the surrounding environment through a transparent or semi-transparent waveguide(s) and/or lens(es) of the AR glasses. Throughout this application, the term "extended reality (XR)" is used as a catchall term to cover both ARs and MRs. In addition, this application also uses, at times, a head-wearable device or headset device as a catchall term that covers XR headsets such as AR glasses and MR headsets.

As alluded to above, an MR environment, as described herein, can include, but is not limited to, non-immersive, semi-immersive, and fully immersive VR environments. As also alluded to above, AR environments can include marker-based AR environments, markerless AR environments, location-based AR environments, and projection-based AR environments. The above descriptions are not exhaustive and any other environment that allows for intentional environmental lighting to pass through to the user would fall within the scope of an AR, and any other environment that does not allow for intentional environmental lighting to pass through to the user would fall within the scope of an MR.

The AR and MR content can include video, audio, haptic events, sensory events, or some combination thereof, any of which can be presented in a single channel or in multiple channels (such as stereo video that produces a three-dimensional effect to a viewer). Additionally, AR and MR can also be associated with applications, products, accessories, services, or some combination thereof, which are used, for example, to create content in an AR or MR environment and/or are otherwise used in (e.g., to perform activities in) AR and MR environments.

Interacting with these AR and MR environments described herein can occur using multiple different modalities and the resulting outputs can also occur across multiple different modalities. In one example AR or MR system, a user can perform a swiping in-air hand gesture to cause a song to be skipped by a song-providing application programming interface (API) providing playback at, for example, a home speaker.

A hand gesture, as described herein, can include an in-air gesture, a surface-contact gesture, and or other gestures that can be detected and determined based on movements of a single hand (e.g., a one-handed gesture performed with a user's hand that is detected by one or more sensors of a wearable device (e.g., electromyography (EMG) and/or inertial measurement units (IMUs) of a wrist-wearable device, and/or one or more sensors included in a smart textile wearable device) and/or detected via image data captured by an imaging device of a wearable device (e.g., a camera of a head-wearable device, an external tracking camera setup in the surrounding environment)). "In-air" generally includes gestures in which the user's hand does not contact a surface, object, or portion of an electronic device (e.g., a head-wearable device or other communicatively coupled device, such as the wrist-wearable device), in other words the gesture is performed in open air in 3D space and without contacting a surface, an object, or an electronic device. Surface-contact gestures (contacts at a surface, object, body part of the user, or electronic device) more generally are also contemplated in which a contact (or an intention to contact) is detected at a surface (e.g., a single- or double-finger tap on a table, on a user's hand or another finger, on the user's leg, a couch, a steering wheel). The different hand gestures disclosed herein can be detected using image data and/or sensor data (e.g., neuromuscular signals sensed by one or more biopotential sensors (e.g., EMG sensors) or other types of data from other sensors, such as proximity sensors, ToF sensors, sensors of an IMU, capacitive sensors, strain sensors) detected by a wearable device worn by the user and/or other electronic devices in the user's possession (e.g., smartphones, laptops, imaging devices, intermediary devices, and/or other devices described herein).

The input modalities as alluded to above can be varied and are dependent on a user's experience. For example, in an interaction in which a wrist-wearable device is used, a user can provide inputs using in-air or surface-contact gestures that are detected using neuromuscular signal sensors of the wrist-wearable device. In the event that a wrist-wearable device is not used, alternative and entirely interchangeable input modalities can be used instead, such as camera(s) located on the headset/glasses or elsewhere to detect in-air or surface-contact gestures or inputs at an intermediary processing device (e.g., through physical input components (e.g., buttons and trackpads)). These different input modalities can be interchanged based on both desired user experiences, portability, and/or a feature set of the product (e.g., a low-cost product may not include hand-tracking cameras).

While the inputs are varied, the resulting outputs stemming from the inputs are also varied. For example, an in-air gesture input detected by a camera of a head-wearable device can cause an output to occur at a head-wearable device or control another electronic device different from the head-wearable device. In another example, an input detected using data from a neuromuscular signal sensor can also cause an output to occur at a head-wearable device or control another electronic device different from the head-wearable device. While only a couple examples are described above, one skilled in the art would understand that different input modalities are interchangeable along with different output modalities in response to the inputs.

Specific operations described above may occur as a result of specific hardware. The devices described are not limiting and features on these devices can be removed or additional features can be added to these devices. The different devices can include one or more analogous hardware components. For brevity, analogous devices and components are described herein. Any differences in the devices and components are described below in their respective sections.

As described herein, a processor (e.g., a central processing unit (CPU) or microcontroller unit (MCU)), is an electronic component that is responsible for executing instructions and controlling the operation of an electronic device (e.g., a wrist-wearable device, a head-wearable device, a handheld intermediary processing device (HIPD), a smart textile-based garment, or other computer system). There are various types of processors that may be used interchangeably or specifically required by embodiments described herein. For example, a processor may be (i) a general processor designed to perform a wide range of tasks, such as running software applications, managing operating systems, and performing arithmetic and logical operations; (ii) a microcontroller designed for specific tasks such as controlling electronic devices, sensors, and motors; (iii) a graphics processing unit (GPU) designed to accelerate the creation and rendering of images, videos, and animations (e.g., VR animations, such as three-dimensional modeling); (iv) a field-programmable gate array (FPGA) that can be programmed and reconfigured after manufacturing and/or customized to perform specific tasks, such as signal processing, cryptography, and machine learning; or (v) a digital signal processor (DSP) designed to perform mathematical operations on signals such as audio, video, and radio waves. One of skill in the art will understand that one or more processors of one or more electronic devices may be used in various embodiments described herein.

As described herein, controllers are electronic components that manage and coordinate the operation of other components within an electronic device (e.g., controlling inputs, processing data, and/or generating outputs). Examples of controllers can include (i) microcontrollers, including small, low-power controllers that are commonly used in embedded systems and Internet of Things (IoT) devices; (ii) programmable logic controllers (PLCs) that may be configured to be used in industrial automation systems to control and monitor manufacturing processes; (iii) system-on-a-chip (SoC) controllers that integrate multiple components such as processors, memory, I/O interfaces, and other peripherals into a single chip; and/or (iv) DSPs. As described herein, a graphics module is a component or software module that is designed to handle graphical operations and/or processes and can include a hardware module and/or a software module.

As described herein, memory refers to electronic components in a computer or electronic device that store data and instructions for the processor to access and manipulate. The devices described herein can include volatile and non-volatile memory. Examples of memory can include (i) random access memory (RAM), such as DRAM, SRAM, DDR RAM or other random access solid state memory devices, configured to store data and instructions temporarily; (ii) read-only memory (ROM) configured to store data and instructions permanently (e.g., one or more portions of system firmware and/or boot loaders); (iii) flash memory, magnetic disk storage devices, optical disk storage devices, other non-volatile solid state storage devices, which can be configured to store data in electronic devices (e.g., universal serial bus (USB) drives, memory cards, and/or solid-state drives (SSDs)); and (iv) cache memory configured to temporarily store frequently accessed data and instructions. Memory, as described herein, can include structured data (e.g., SQL databases, MongoDB databases, GraphQL data, or JSON data). Other examples of memory can include (i) profile data, including user account data, user settings, and/or other user data stored by the user; (ii) sensor data detected and/or otherwise obtained by one or more sensors; (iii) media content data including stored image data, audio data, documents, and the like; (iv) application data, which can include data collected and/or otherwise obtained and stored during use of an application; and/or (v) any other types of data described herein.

As described herein, a power system of an electronic device is configured to convert incoming electrical power into a form that can be used to operate the device. A power system can include various components, including (i) a power source, which can be an alternating current (AC) adapter or a direct current (DC) adapter power supply; (ii) a charger input that can be configured to use a wired and/or wireless connection (which may be part of a peripheral interface, such as a USB, micro-USB interface, near-field magnetic coupling, magnetic inductive and magnetic resonance charging, and/or radio frequency (RF) charging); (iii) a power-management integrated circuit, configured to distribute power to various components of the device and ensure that the device operates within safe limits (e.g., regulating voltage, controlling current flow, and/or managing heat dissipation); and/or (iv) a battery configured to store power to provide usable power to components of one or more electronic devices.

As described herein, peripheral interfaces are electronic components (e.g., of electronic devices) that allow electronic devices to communicate with other devices or peripherals and can provide a means for input and output of data and signals. Examples of peripheral interfaces can include (i) USB and/or micro-USB interfaces configured for connecting devices to an electronic device; (ii) Bluetooth interfaces configured to allow devices to communicate with each other, including Bluetooth low energy (BLE); (iii) near-field communication (NFC) interfaces configured to be short-range wireless interfaces for operations such as access control; (iv) pogo pins, which may be small, spring-loaded pins configured to provide a charging interface; (v) wireless charging interfaces; (vi) global-positioning system (GPS) interfaces; (vii) Wi-Fi interfaces for providing a connection between a device and a wireless network; and (viii) sensor interfaces.

As described herein, sensors are electronic components (e.g., in and/or otherwise in electronic communication with electronic devices, such as wearable devices) configured to detect physical and environmental changes and generate electrical signals. Examples of sensors can include (i) imaging sensors for collecting imaging data (e.g., including one or more cameras disposed on a respective electronic device, such as a simultaneous localization and mapping (SLAM)

camera); (ii) biopotential-signal sensors; (iii) IMUs for detecting, for example, angular rate, force, magnetic field, and/or changes in acceleration; (iv) heart rate sensors for measuring a user's heart rate; (v) peripheral oxygen saturation (SpO2) sensors for measuring blood oxygen saturation and/or other biometric data of a user; (vi) capacitive sensors for detecting changes in potential at a portion of a user's body (e.g., a sensor-skin interface) and/or the proximity of other devices or objects; (vii) sensors for detecting some inputs (e.g., capacitive and force sensors); and (viii) light sensors (e.g., ToF sensors, infrared light sensors, or visible light sensors), and/or sensors for sensing data from the user or the user's environment. As described herein biopotential-signal-sensing components are devices used to measure electrical activity within the body (e.g., biopotential-signal sensors). Some types of biopotential-signal sensors include (i) electroencephalography (EEG) sensors configured to measure electrical activity in the brain to diagnose neurological disorders; (ii) electrocardiogramansors configured to measure electrical activity of the heart to diagnose heart problems; (iii) EMG sensors configured to measure the electrical activity of muscles and diagnose neuromuscular disorders; (iv) electrooculography (EOG) sensors configured to measure the electrical activity of eye muscles to detect eye movement and diagnose eye disorders.

As described herein, an application stored in memory of an electronic device (e.g., software) includes instructions stored in the memory. Examples of such applications include (i) games; (ii) word processors; (iii) messaging applications; (iv) media-streaming applications; (v) financial applications; (vi) calendars; (vii) clocks; (viii) web browsers; (ix) social media applications; (x) camera applications; (xi) web-based applications; (xii) health applications; (xiii) AR and MR applications; and/or (xiv) any other applications that can be stored in memory. The applications can operate in conjunction with data and/or one or more components of a device or communicatively coupled devices to perform one or more operations and/or functions.

As described herein, communication interface modules can include hardware and/or software capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, or MiWi), custom or standard wired protocols (e.g., Ethernet or HomePlug), and/or any other suitable communication protocol, including communication protocols not yet developed as of the filing date of this document. A communication interface is a mechanism that enables different systems or devices to exchange information and data with each other, including hardware, software, or a combination of both hardware and software. For example, a communication interface can refer to a physical connector and/or port on a device that enables communication with other devices (e.g., USB, Ethernet, HDMI, or Bluetooth). A communication interface can refer to a software layer that enables different software programs to communicate with each other (e.g., APIs and protocols such as HTTP and TCP/IP).

As described herein, a graphics module is a component or software module that is designed to handle graphical operations and/or processes and can include a hardware module and/or a software module. As described herein, non-transitory computer-readable storage media are physical devices or storage medium that can be used to store electronic data in a non-transitory form (e.g., such that the data is stored permanently until it is intentionally deleted and/or modified).

Example System

FIG. 1 illustrates an extended-reality (XR) system 100, in accordance with some embodiments. The XR system 100 can be any XR system described below in reference to FIGS. 7A-7C. The XR system 100 includes a head-wearable device 110, a wrist-wearable device 115, a controller 120, an HIPD 125, and/or at least one other input device (e.g., a mobile device 750, a computer 740, and/or any other devices described below in reference to FIGS. 7A-7C). The head-wearable device 110 includes at least one display for presenting an XR environment to a user 105 and at least one sensor (e.g., one or more imaging devices to track eye of the user 105 and/or to capture a scene of the user's field of view, one or more IMUs to track a head position and/or orientation of the user 105, etc.). In some embodiments, each device to the XR system 100 includes at least on sensor. The sensor data obtained from the one or more devices of the XR system 100 can be used to detect one or more user inputs. The head-wearable device 110, the wrist-wearable device 115, the controller 120, the HIPD 125 and/or other input devices of the XR system 100 can include computer-readable storage mediums including one or more instructions and one or more processors configured to execute the instructions stored on the computer-readable storage mediums. The head-wearable device 110, the wrist-wearable device 115, the controller 120, the HIPD 125 and/or other input devices of the XR system 100 can be communicatively coupled. The XR system 100 can include more or less devices than those described above.

As described below, the XR system 100 and/or one or more devices of the XR system 100 (e.g., the head-wearable device 110 or other wearable device) can use a self-supervised contrastive learning schema to learn aligned embeddings of multimodal user behavioral data (e.g., contrastive training of an embedding function 160). For contrastive training, the XR system 100 defines positive pairs of samples or data, which are defined by data obtained from different input modalities (e.g., imaging devices, IMUs, neuromuscular signal sensors, etc.) that were recorded during the same period of time as positive pairs, and the rest as negative pairs. In this way, the XR system 100 is able to learn embeddings without any information about a particular task, which further allows the embeddings to encode information for multiple purposes. Additionally, the contrastive learning schema allows for data from various sensor sets to be combined, which allows the contrastive training of an embedding function 160 to learn robust features generalized across various sensor sets. The contrastive training of an embedding function 160 is able to learn relationships between at least two input modalities (e.g., hand, gaze, or both individually), which can be useful for any number of applications.

An output of the contrastive training of an embedding function 160 is used to train multiple smaller linear models to predict task labels from the embeddings in parallel (e.g., supervised training of the models to predict task labels 170). The learned embedding encoders together with the small linear models are then deployed as a multi-task multi-sensor set architecture (e.g., Multi-Task Multi-Sensor Set Inference 180), which allow the XR system 100, or the device thereof, to efficiently use powerful deep feature extraction networks-overcoming compute and/or memory constraints of some devices, such as wearable devices (e.g., the head-wearable device 110, the wrist-wearable device 115, etc.).

Additionally, data obtained over time by wearable devices can fluctuate due to manual adjustments of the wearable device (e.g., movement of the user due to discomfort) and/or gradual sensor drift, which can lead to inaccurate and/or unusable data. The systems and methods disclosed herein address the fluctuations in data by generating distinct embeddings for respective input modalities (e.g., hand-tracking data, gaze data, etc.) during the learning process. In order to optimize the embedding function, the systems and methods maximize similarity between embeddings recorded simultaneously, which allows for applications that use the similarity or dissimilarity to make informed decisions. For example, in using data streams from two gaze and hand sensors, the similarity between embeddings can detect sensor drift, automatically triggering re-calibration.

The systems and methods disclosed herein provide a solution for processing user behavioral data (e.g., inputs at one or more input modalities, such as imaging devices, IMUs, neuromuscular signal sensors, controllers, etc.) on compute and memory restricted platforms, such as wearable devices. The systems and methods disclosed herein enable the detection of various tasks and sensor sets without significantly increasing compute and memory budgets of devices. Additional information on the operations performed by the XR system 100 and/or devices thereof is provided below in reference to FIGS. 2-6.

Figure 2:
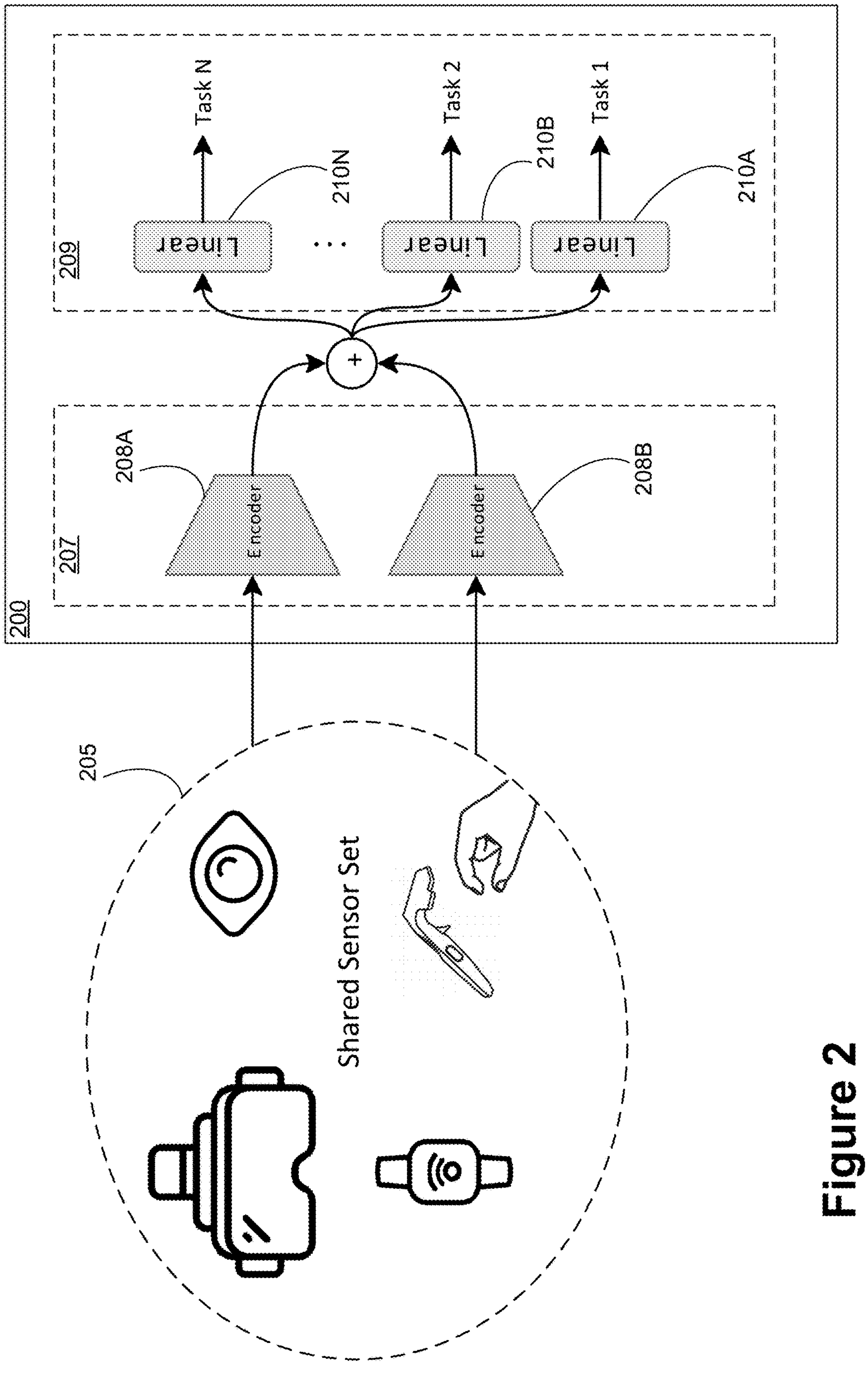
FIG. 2 illustrates an XR interaction model for determining a task based on data captured at a shared sensor set, in accordance with some embodiments.

FIG. 2 illustrates an XR interaction model for determining a task based on data captured at a shared sensor set, in accordance with some embodiments. The shared sensor set 205 includes a plurality of sensors of the sensors of the XR system 100 (FIG. 1). The plurality of sensors of the shared sensor set 205 are a combination of sensors of at least two devices of the XR system 100 an/or a combination of at least two sensors of a device of the XR system 100. Each sensor of the shared sensor set 205 provides respective data which is representative of a user input (e.g., a user's gaze, hand gestures, controller inputs, etc.).

In some embodiments, the shared sensor set 205 includes a first set of sensors of a first device and a second set of sensors of a second device distinct from the first device. For example, the shared sensor set 205 can include an imaging device of the head-wearable device configured to track the eyes of the user 105 and a biopotential signal sensor of the wrist-wearable device 115 (e.g., an electromyography (EMG) sensor) configured to detect hand gestures performed by the user 105. In another example, the shared sensor set 205 can include an inertial measurement unit (IMU) of the head-wearable device 110 configured to infer a location of the user's gaze and an IMU of the wrist-wearable device 115 configured to detect hand gestures performed by the user 105. In yet another example, the shared sensor set 205 can include an imaging device of the head-wearable device 110 configured to detect hand gestures (or hand position) performed by the user 105 and an IMU of the HIPD 125. Alternatively, or in addition, in some embodiments, the shared sensor set 205 includes different sensors of a single device. For example, the shared sensor set 205 can include a first imaging device of the head-wearable device configured to track the eyes of the user 105 and a second imaging device of the head-wearable device configured to track the hands of the user 105. In another example, the shared sensor set 205 can include an IMU of the head-wearable device configured to track a head position and/or head orientation of the user 105 and an imaging device of the head-wearable device configured to track the hands of the user 105.

At least one device of the XR system 100 includes the XR interaction model 200. The at least one device of the XR system 100 receives the respective data from each sensor of the shared sensor set 205 and, based on the respective data, the determines, using the XR interaction model 200, third data that describes a relationship between the respective data. In particular, the third data describes a temporal relationship between user inputs captured at each sensor of the shared sensor set 205 (e.g., temporally-aligned gaze and hand data into task- and sensor set-agnostic representations). For example, the head-wearable device 110 can receive image data from an integrated or coupled image sensor and biopotential signal sensor data from a biopotential signal sensor of wrist-wearable device 115 to determine third data that describes a relationship between the image data and the biopotential signal sensor data (e.g., to detect a hand gesture and/or location at which the hand gesture is performed). The XR interaction model 200 is sensor set-agnostic. More specifically, the XR interaction model 200 is configured to utilize sensor data from any respective sensors combination (e.g., sensors of at least two devices of the XR system 100 (e.g., at least one sensor from each device used with the XR interaction model 200) or different sensors from a single device). The XR interaction model 200 includes at least a feature extraction mechanism 207 and a task solving mechanism 209.

The feature extraction mechanism 207 includes at least two encoders 208A and 208B. In some embodiments, the feature extraction mechanism 207 includes an encoder for each sensor input. For example, the feature extraction mechanism 207 shown in FIG. 2 includes a first encoder 208A configured to receive sensor data from a sensor of a first device (e.g., image data from the head-wearable device 110) and a second encoder 208B configured to receive sensor data from another sensor of a second device (IMU data from the wrist-wearable device 115). In some embodiments the at least two encoders 208A and 208B are machine-learning models configured to encode the respective output data. In some embodiments, the at least two encoders 208A and 208B of the feature extraction mechanism 207 are contrastively-trained (e.g., contrastively-trained encoders) and generate respective outputs that are used to determine a relationship between extracted features (e.g., aligning respective embeddings from the respective data (e.g., temporally aligning data) to create aligned embeddings that describe a relationship between the respective data). Alternatively, the least two encoders 208 are trained using other available methods and/or models.

In some embodiments, the XR interaction model 200, in accordance with a determination that the first data or the second data are below a predetermined accuracy threshold (e.g., a first sensor or a second sensor are inactive, malfunctioning, positioned incorrectly, non-responsive, or otherwise dead), determines replacement data for a respective sensor with data below the predetermined accuracy threshold. Specifically, the XR interaction model 200 can generate a hallucinating embedding of high frequency for sensor data below the predetermined accuracy threshold (e.g., replacement data hallucinates an embedding of the first data or the second data). The XR interaction model 200 utilizes the replacement data and the sensor data above the predetermined accuracy threshold to determine an output for the feature extraction mechanism 207, which can be used to describe a relationship between the first data or the second data and the replacement data. The XR interaction model 200 determines the replacement data based on previously received data, outputs of the at least two encoders 208A and 208B, and/or output of the feature extraction mechanism 207 (e.g., combined respective outputs of the at least two encoders 208A and 208B). The computing device then determines fourth data using the contrastively-trained model.

Based on the third data (or, alternatively, the fourth data) generated by the feature extraction mechanism 207 (e.g., the combined respective outputs of the at least two encoders 208A and 208B), the XR interaction model 200 determines a task to be performed at the XR system 100 (e.g., at the head-wearable device 110, the at least one input device, and/or a communicatively coupled computing device). The XR interaction model 200 determines the task to performed using a task-solving mechanism 209. The task-solving mechanism 209 includes one or more task-inferring models 210A-210. Each task-inferring model 210A-210N is a linear model configured to predict a task from the aligned embeddings (e.g., the third data). Specifically, each task-inferring model 210A-210N is configured to determine a respective task to be performed at the head-wearable device 110, the at least one input device, and/or the communicatively coupled computing device. The task-inferring models 210A-210N are trained using supervised learning and predict task labels (e.g., the "linears" predict task labels). Tasks determined by the task-inferring models 210A-210N include, but are not limited to, gesture recognition, input prediction, input disambiguation, input error detection, sensor drift detection (e.g., identifying sensors that are not returning expected values, malfunctioning etc.), gaze and user input coordination, goal-oriented movement detection, and/or endpoint prediction.

The task-inferring models 210A-210N utilize substantially less computational resources (e.g., memory, processing time, power, etc.) than the feature extraction mechanism 207, which allows the XR interaction model 200 to include a large library of task-inferring models 210A-210N. Because the feature extraction mechanism 207 is configured to be sensor agnostic, the XR interaction model 200 allows for greater flexibility and functionality as a large library of task-inferring models 210A-210N can be used to predict a variety of tasks for different sensor sets. In contrast, systems that require respective models for each sensor set combination have limited functionality when used with wearable devices.

In some embodiments, after the contrastive training process is completed, the nonlinear projection heads are removed and the parameters of the encoders (e.g., encoders 208A and 208B) are frozen. In some embodiments, a set of data-specific linear layers (e.g., task-inferring models 210A-210N) are trained by optimizing a focal (binary) cross entropy loss if the task is a (binary) classification task, or a mean squared error (MSE) loss if the task is a regression task. The systems and methods disclosed herein train a predetermined number of linear models equal to the number of downstream tasks that are enabled by the systems and methods.

As a practical example, the head-wearable device 110 captures, using an imaging device, image data indicative of a user's gaze and provides the captured image data (e.g., first data) to the XR interaction model 200, and the wrist-wearable device 115 obtains, from an EMG sensor, EMG sensor data indicative of the user's hand gestures and provides the EMG sensor data (e.g., second data) to the XR interaction model 200. The XR interaction model 200 uses the image data and the EMG data with the feature extraction mechanism 207 to determine an output (e.g., third data) that describes a relationship between the first data and the second data (e.g., the temporal relationship between the user's gaze and the user's hand gestures). The XR interaction model 200 uses the output of the feature extraction mechanism 207 with the task-solving mechanism 209 to determine a task (e.g., selection of an object in the XR environment presented by the head-wearable device 110). The XR interaction model 200 then provides instructions to the head-wearable device 110 and/or the wrist-wearable device 115 to cause performance of the task (e.g., providing instructions to the head-wearable device 110 to change the XR environment and/or providing instructions to the wrist-wearable device 115 to provide haptic feedback).

Figure 3:
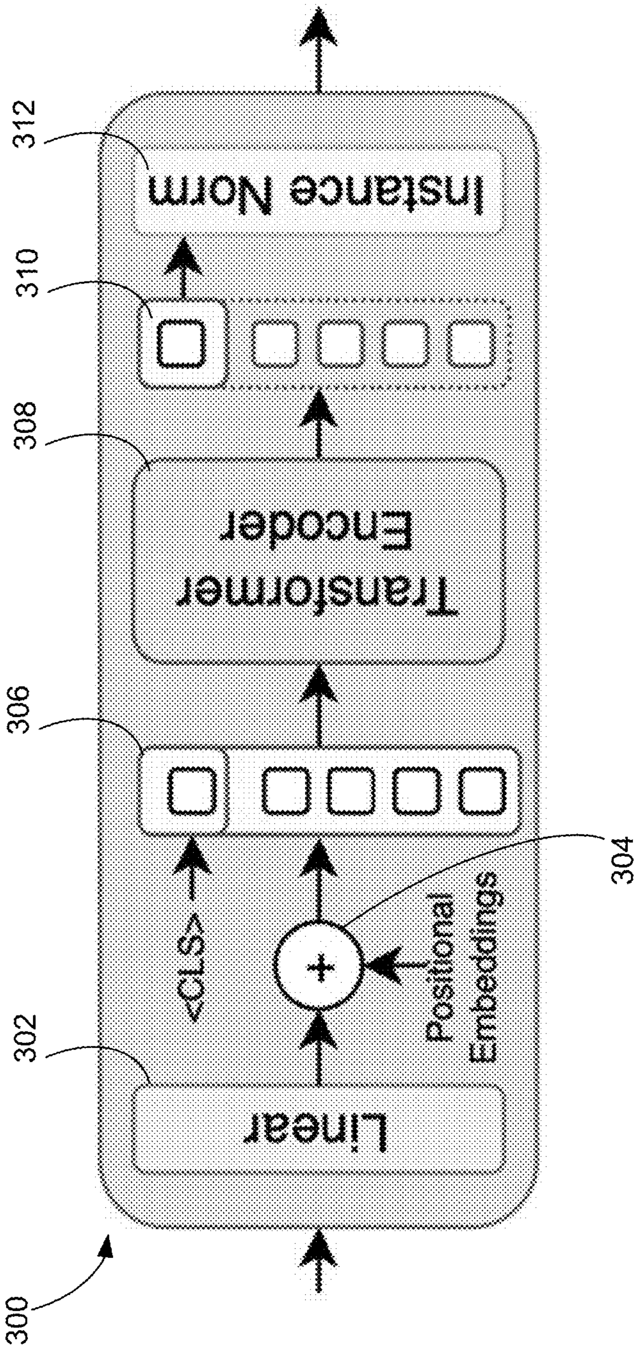
FIG. 3 illustrates an example encoder for encoding sensor data before being processed by a contrastively-trained model, in accordance with some embodiments.

FIG. 3 illustrates an example encoder 300 of one of at least two encoders 208A and 208B, in accordance with some embodiments. The example encoder 300 receives sensor data from a sensor of a shared sensor set. As described above in reference to FIG. 2, the outputs of the at least two encoders 208A and 208B are used by a task-solving mechanism 209 to determine a task. The example encoder 300 receives sensor data from a sensor, models the sensor data using a linear model 302, combines the sensor data with positional embeddings 304 associated with the sensor, classifies the sensor data with a first classify token 306, encodes the sensor data with a transformer encoder 308, classifies the sensor data again with a second classify token 310, normalizes the sensor data with instance normalization 312, and outputs the sensor data to determine the third data (e.g., the combined respective outputs of the at least two encoders 208A and 208B).

Figure 4:
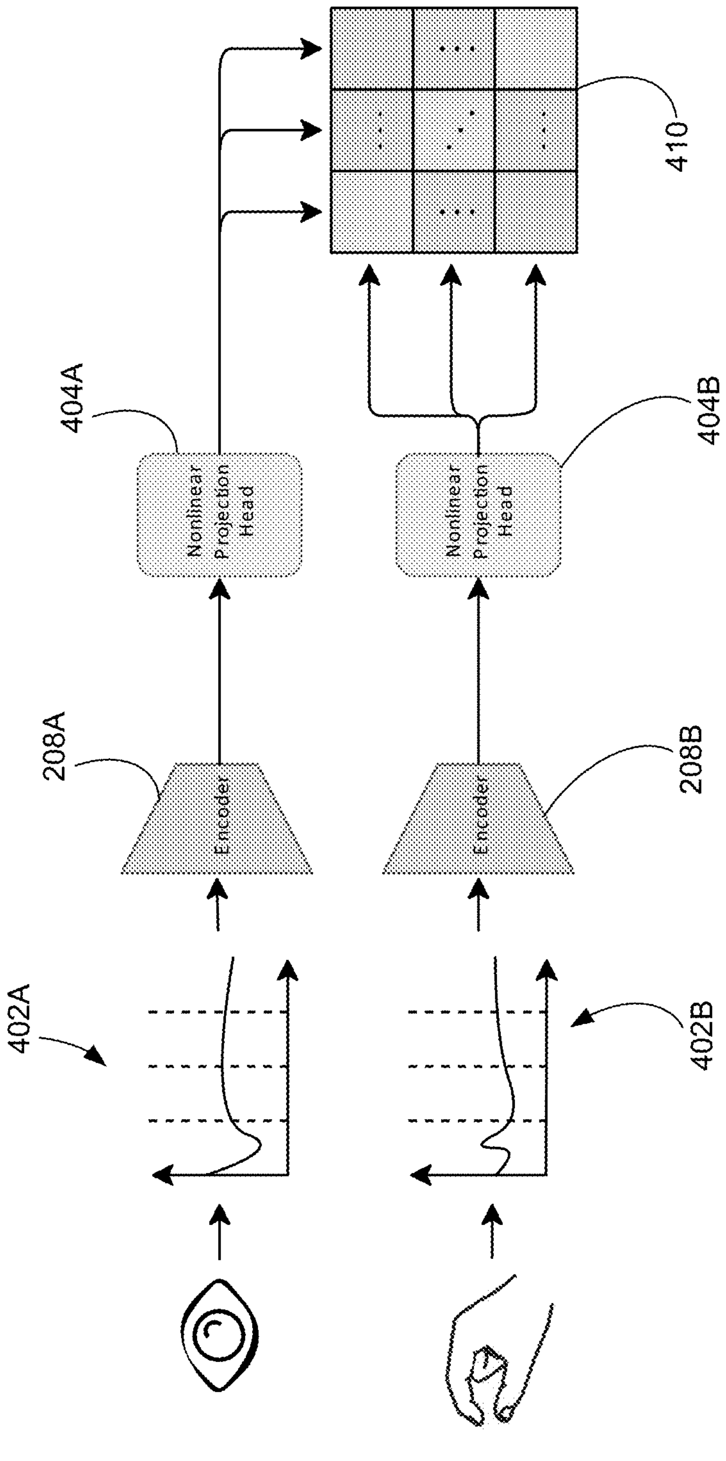
FIG. 4 illustrates a illustrates a diagram of a contrastively-trained model that is trained to determine the aligned embeddings of behavioral data of a user using a self-supervised contrastive-training schema, in accordance with some embodiments.

FIG. 4 illustrates a diagram of contrastive training of the feature extraction mechanism, in accordance with some embodiments. As described above in reference to FIG. 2, the feature extraction mechanism 207 is trained to determine the aligned embeddings of behavioral data of the user 105 to determine the third data set. In some embodiments, the feature extraction mechanism 207 uses a self-supervised contrastive-training schema to determine the third data. The self-supervised contrastive-training schema uses data from at least two inputs (e.g., gaze related data 402A and hand-gestures related data 402B). The at least two inputs are temporally aligned. The at least two inputs 402A and 402B are used to determine positive pairs (e.g., green elements of an array 410) and negative pairs (e.g., red elements of the array 410). In some embodiments, the positive pairs are portions of the at least two data inputs that define a temporal relationship between the respective input data (e.g., gaze direction and performance of a particular hand gesture or data that was recorded during a same period of time that an input was detected). In some embodiments, the negative pairs are portions of the at least two data inputs that do not include temporally aligned inputs. The at least two data inputs 402A and 402B are encoded by the respective encoders 208A and 208B and are then transformed by respective nonlinear projection heads 404A and 404B, based, at least, on the period of time that each portion of the at least two data inputs 402A and 402B were recorded. Based on sorted data samples output by the respective nonlinear projection heads 404A and 404B, the self-supervised contrastive-training schema determines the aligned embeddings. Since the aligned embeddings are determined without labelled data, the aligned embeddings are learned without any information about a particular task, which leads the contrastively-trained model to encode information for multiple tasks, rather than only pieces of information relevant for a single task.

The contrastive-learning schema can train the contrastively-trained model on data of a variety of sensor sets, in accordance with some embodiments. In other words, FIG. 4 shows determining a relationship between gaze and hand gestures, temporal relationships can be defined for other combinations of inputs (e.g., gaze and controller inputs, hang gesture and controller inputs, hand gesture inputs detected by at least two distinct devices, etc.)

The systems and method disclosed here employ the self-supervised contrastive objective to learn a task-agnostic embedding function that is robust to changes in the data recorded by input modalities. The self-supervised contrastive learning aims at training machine learning models to map data to meaningful representations (e.g., embeddings) by maximizing the similarity between positive pairs of data and minimizing the similarity between negative pairs. The positive and negative pairs can be defined without using task labels, thus the extracted features are task-agnostic and can be reused for multiple downstream tasks. A pair of two encoded signals are defined as positive if and only if they were recorded during the same period of time. All other pairs of signals are considered as negative samples. Additionally, the systems and method disclosed herein train the encoder mechanism through optimizing an infoNCE loss (where NCE stands for Noise-Contrastive Estimation) in the shared embedding space, which lead to the encoders learning to output similar embeddings for user behavioral data (e.g., gaze data and hand data) that were recorded during the same period of time, and dissimilar embeddings for other pairs.

Figure 5:
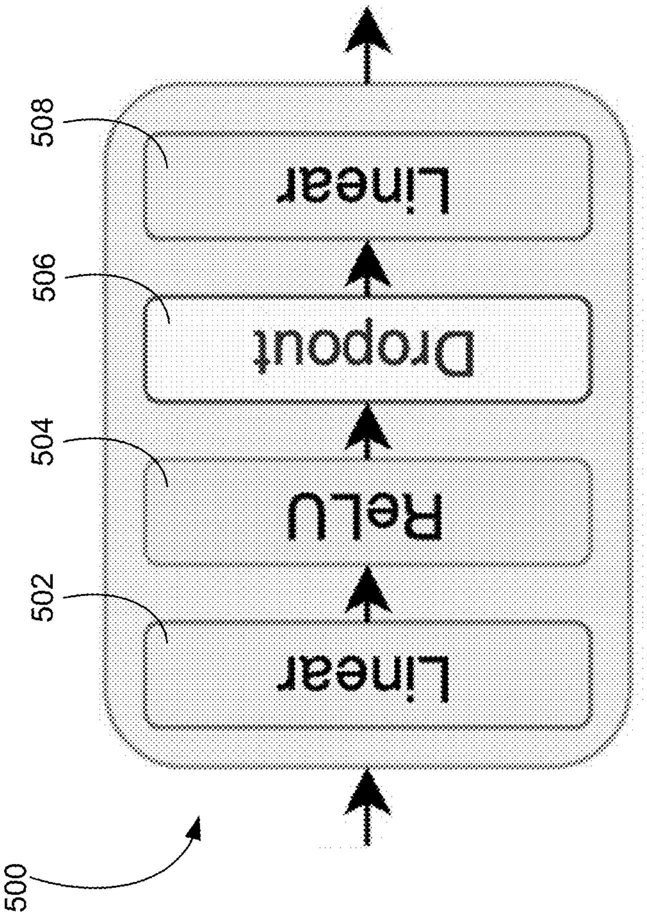
FIG. 5 illustrates an example nonlinear projection head for training a contrastively-trained model, in accordance with some embodiments.

FIG. 5 illustrates an example nonlinear projection head 500 of one of the respective nonlinear projection heads 404A-404B, in accordance with some embodiments. The example nonlinear projection head 500 receives a data sample, models the data sample using a first linear model 502, transforms the data sample using a rectified linear unit 504, regularizes the data sample using a dropout technique 506, models the data sample again using a second linear model 508, and outputs the sorted data sample.

Figure 6:
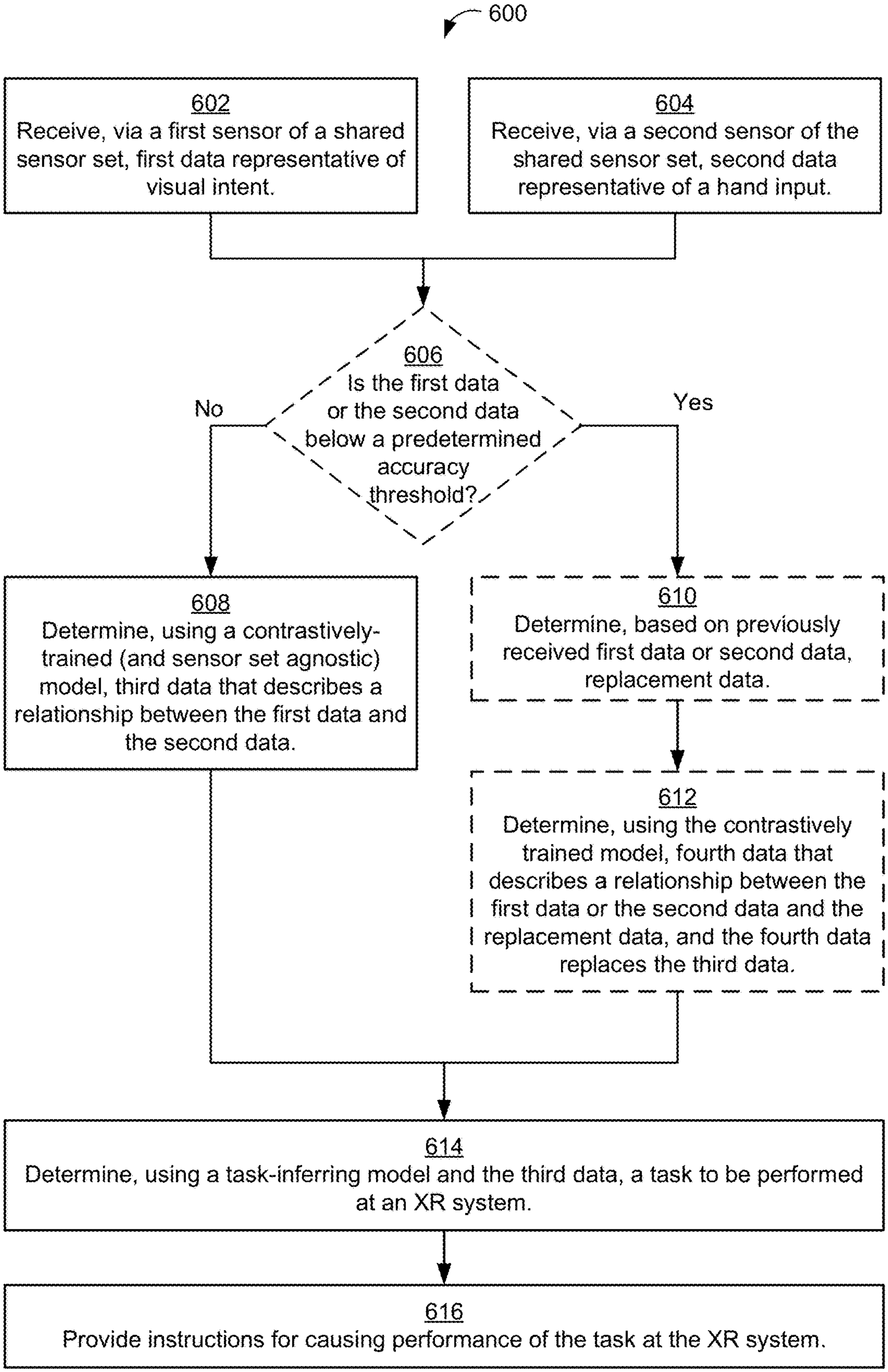
FIG. 6 illustrates method for determining a task based on data captured at a shared sensor set of an XR system, in accordance with some embodiments.

FIG. 6 illustrates a method 600 for determining a task based on data captured at a shared sensor set of an XR system 100 with a head-wearable device 110, at least one input device, a HIPD, and/or another computing device, in accordance with some embodiments. The method 600 includes receiving (602), via a first sensor of a shared sensor set, first data representative of visual intent (e.g., data indicative of a user's gaze), and receiving (604), via a second sensor of the shared sensor set, second data representative of a hand input (e.g., hand gestures, controller inputs, etc.). The method 600 further includes determining (606) whether the first data or the second data are below a predetermined accuracy threshold. The method 600, in accordance with a determination that the first data or the second data are not below the predetermined accuracy threshold ("No" at operation 606), includes determining (608), using a contrastively-trained (and sensor set agnostic) model (e.g., a feature extraction mechanism), third data that describes a relationship between the first data and the second data (e.g., relationship between extracted features).

Alternatively, in accordance with a determination that the first data or the second data are below the predetermined accuracy threshold ("Yes" at operation 606), the method 600 includes determining (610), based on previously received first data or second data, replacement data (e.g., hallucinating an embedding of high frequency stream of the other modality) and determining (612), using the contrastively trained model, fourth data that describes a relationship between the first data or the second data and the replacement data, wherein the fourth data replaces the third data. In some embodiments, the determination that the first data or the second data are below the predetermined accuracy threshold can be due to the first sensor or the second sensor being inactive, malfunctioning, positioned incorrectly, non-responsive, and/or otherwise dead.

The method 600 further includes determining (614), using a task-inferring model (e.g., a task solving model that can determine gesture intentions based on the visual intent and hand inputs) and the third data (e.g., a feature extraction mechanism), a task to be performed at an XR system (e.g., at a device of the system); and providing (616) instructions for causing performance of the task at the XR system.

(A1) In accordance with some embodiments, a non-transitory computer readable storage medium includes instructions to be executed by a computing device (e.g., the computing device may be a portion of an extended-reality system, where the XR system can include a head-worn electronic device, input devices (such as a controller and/or a smart watch capable of detecting biopotential signals to determine gestures to control the XR system), and an intermediary device in communication with the head-worn device and the input devices) while a shared sensor set is available for use with an extended-reality (XR) system (e.g., sensors of an extended-reality (XR) head-wearable device, sensors of a wrist-wearable device, communicatively coupled sensor, and/or sensors of any other device). The instructions include receiving, via a first sensor of the shared sensor set, first data representative of visual intent (e.g., data indicative of a user's gaze) and receiving, via a second sensor of the shared sensor set, second data representative of a hand input (e.g., hand gestures, controller inputs, etc.). The instructions further include determining, using a contrastively-trained (and sensor set agnostic) model (e.g., a feature extraction mechanism), third data that describes a relationship between the first data and the second data (e.g., relationship between extracted features). The instructions further include determining, using a task-inferring model (e.g., a task solving model that can determine gesture intentions based on the visual intent and hand inputs) and the third data (e.g., a feature extraction mechanism), a task to be performed at the XR system (e.g., at a device of the system). The instructions further include providing instructions for causing performance of the task at the XR system.

(A2) In some embodiments of A1, the contrastively-trained model includes a first encoder configured to receive the first data and a second encoder configured to receiver the second data. Respective outputs of the first encoder and the second encoder are used to determine the third data. For example, as shown in FIG. 2, data from respective encoders can be added. In some embodiments, each encoder receives on sensor input.

(A3) In some embodiments of A1-A2, the task inferring model includes at least two linear models, and each linear model is configured to determine a respective task to be performed at the communicatively coupled device. In some embodiments, the system can include any number of tasks.

(A4) In some embodiments of A1-A3, the task includes gesture recognition, input disambiguation, gaze and user input coordination, and/or goal-oriented movement detection. (e.g., specifically, the tasks can fall into at least one of the following three categories-intent prediction, input error detection, and endpoint prediction).

(A5) In some embodiments of A1-A4, the task includes sensor drift detection. (e.g., identifying sensors that are not returning expected values, malfunctioning, etc.).

(A6) In some embodiments of A1-A5, the instructions further include, in accordance with a determination that the first data or the second data are below a predetermined accuracy threshold (e.g., the first sensor or the second sensor are inactive, malfunctioning, positioned incorrectly, non-responsive, or otherwise dead), (i) determining, based on previously received first data or second data, replacement data (e.g., hallucinating an embedding of high frequency stream of the other modality) and (ii) determining, using the contrastively trained model, fourth data that describes a relationship between the first data or the second data and the replacement data, wherein the fourth data replaces the third data.

(A7) In some embodiments of A1-A6, the shared sensor set includes one or more sensors of an XR head-wearable device, one or more sensors of a wearable device distinct from the XR head-wearable device, and/or one or more sensors of a controller.

(A8) In some embodiments of A1-A7, the first sensor of the shared sensor set is an imaging device of the XR head-wearable device configured to track eyes of a user, and the second sensor of the shared sensor set is a bipotential signal sensor of the wearable device (e.g., EMG of a wrist-wearable device). In some embodiments, IMUs of the XR head-wearable device are used to infer user gaze (e.g., head/eyes facing in a certain direction) alternatively or in addition to imaging device of the XR head-wearable device. Alternatively, in some embodiments, the first sensor and the second sensor are part of the same device (e.g., first imaging device of an XR head-wearable device for tracking hands of the user and a second imaging device of the XR head-wearable device for tracking eyes of the user).

(A9) In some embodiments of A1-A8, the first sensor of the shared sensor set is an imaging device of the XR head-wearable device configured to track eyes of a user, and the second sensor of the shared sensor set is an IMU of the wrist-wearable device.

(A10) In some embodiments of A1-A9, the first sensor of the shared sensor set is an imaging device of the XR head-wearable device configured to track eyes of a user, and the second sensor of the shared sensor set is a force sensor (e.g., or any other sensor included in a controller) of the controller.

(A11) In some embodiments of A1-A10, the first sensor of the shared sensor set is a first imaging device of the XR head-wearable device configured to track eyes of a user, and the second sensor of the shared sensor set is a second imaging device of the XR head-wearable device configured to track hands of the user (e.g., for detecting hand gestures performed by the user).

(A12) In some embodiments of A1-A11, the contrastively trained model is trained by contrastive training of at least two encoders.

(A13) In some embodiments of A1-A12, the task inferring model is trained supervised learning.

(B1) In accordance with some embodiments, a system that includes a head-wearable device, at least one input device and a computing device, and the system is configured to perform operations corresponding to any of A1-A13.

(C1) In accordance with some embodiments, a non-transitory computer readable storage medium including instructions that, when executed by a computing device in communication with a head-wearable device, cause the computing device to perform operations corresponding to any of A1-A13.

(D1) In accordance with some embodiments, a method of operating a head-wearable device, including operations that correspond to any of A1-A13.

(E1) In accordance with some embodiments, a means for performing the operations that correspond to any of A1-A13.

The devices described above are further detailed below, including systems, wrist-wearable devices, headset devices, and smart textile-based garments. Specific operations described above may occur as a result of specific hardware, such hardware is described in further detail below. The devices described below are not limiting and features on these devices can be removed or additional features can be added to these devices. The different devices can include one or more analogous hardware components. For brevity, analogous devices and components are described below. Any differences in the devices and components are described below in their respective sections.

Example Extended-Reality Systems

Figure 7A:
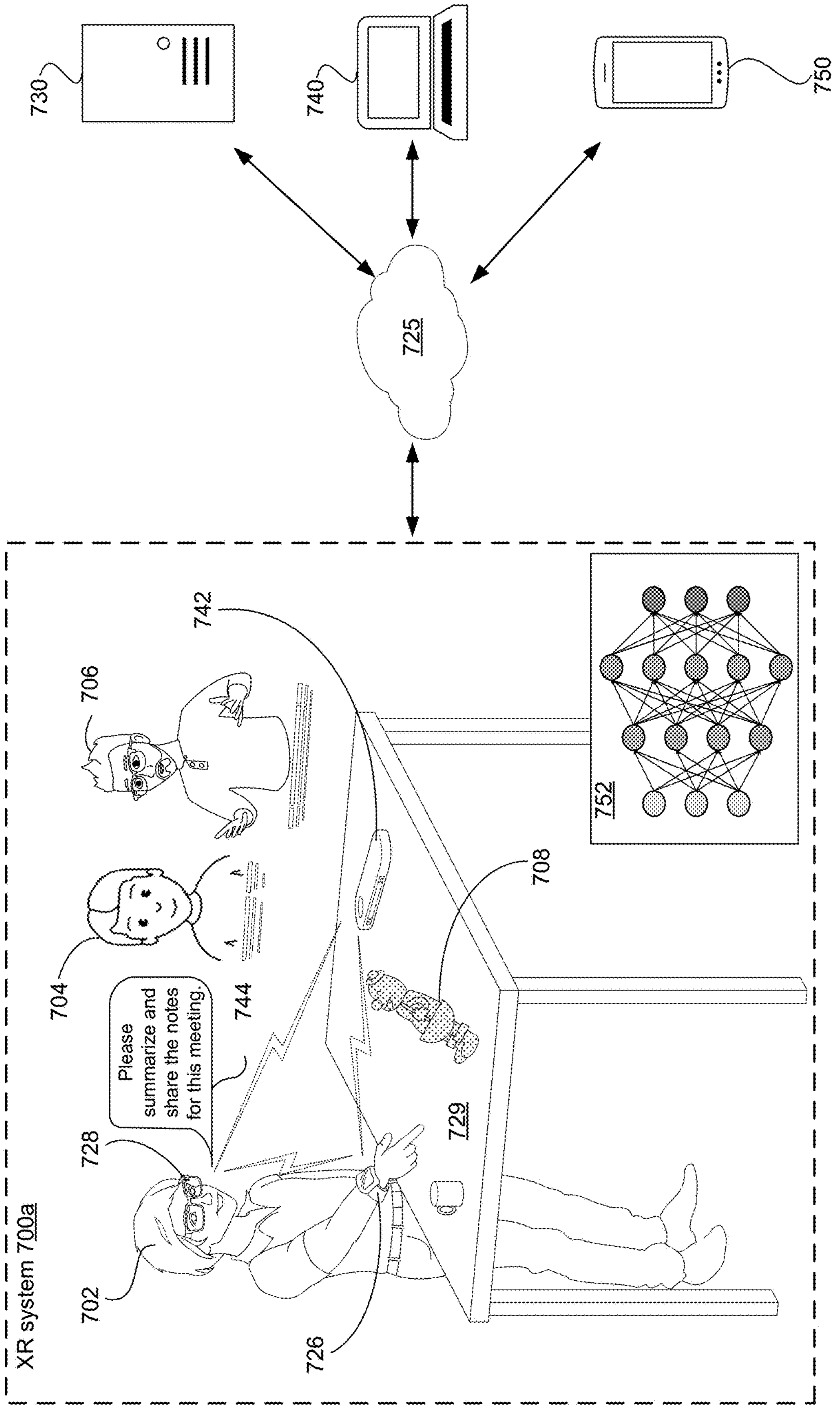
Figure 7B:
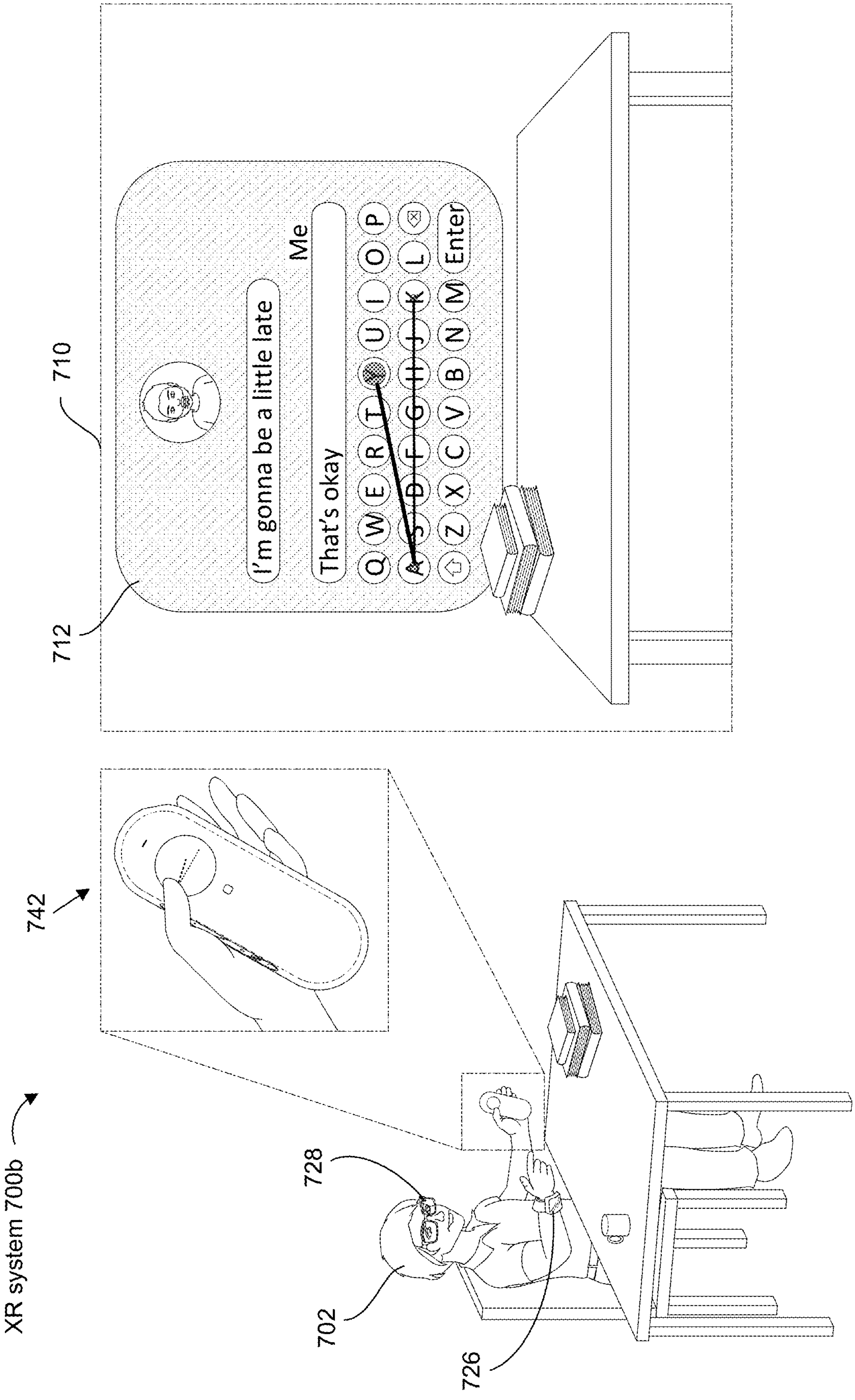
Figures 1, 7C:
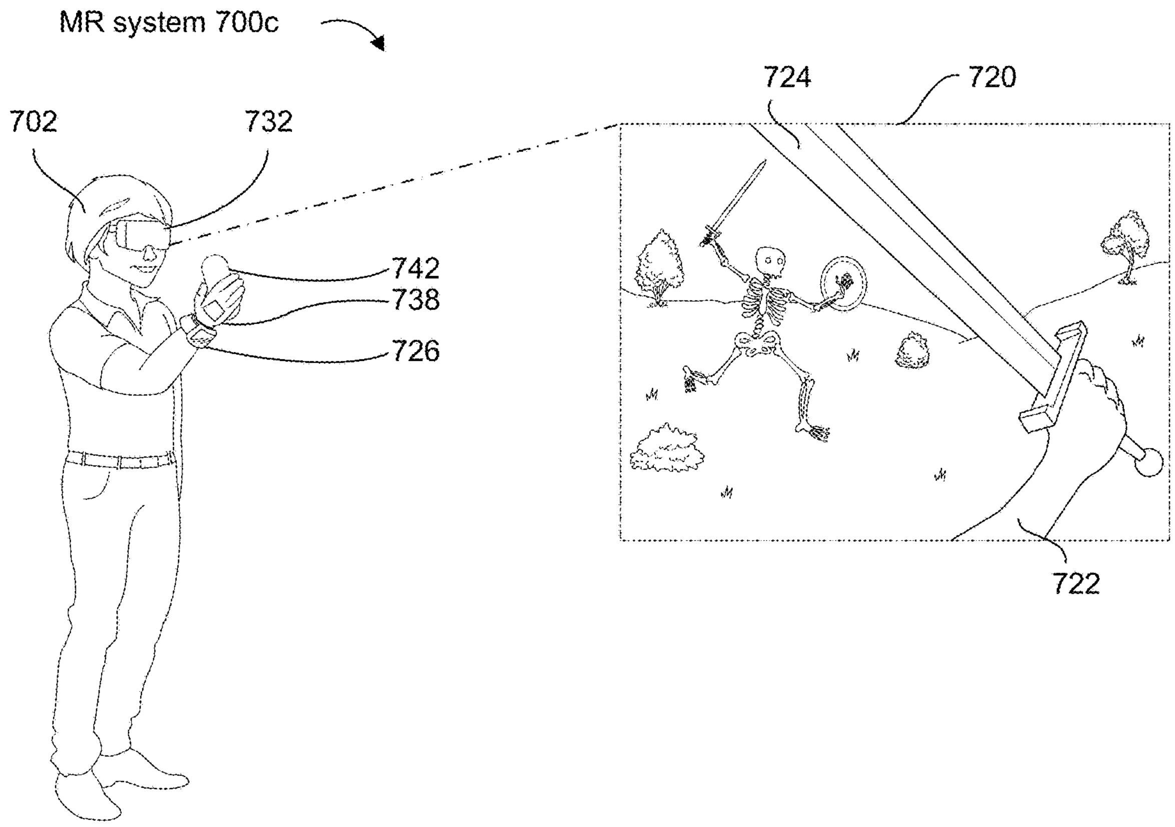
Figures 2, 7C:
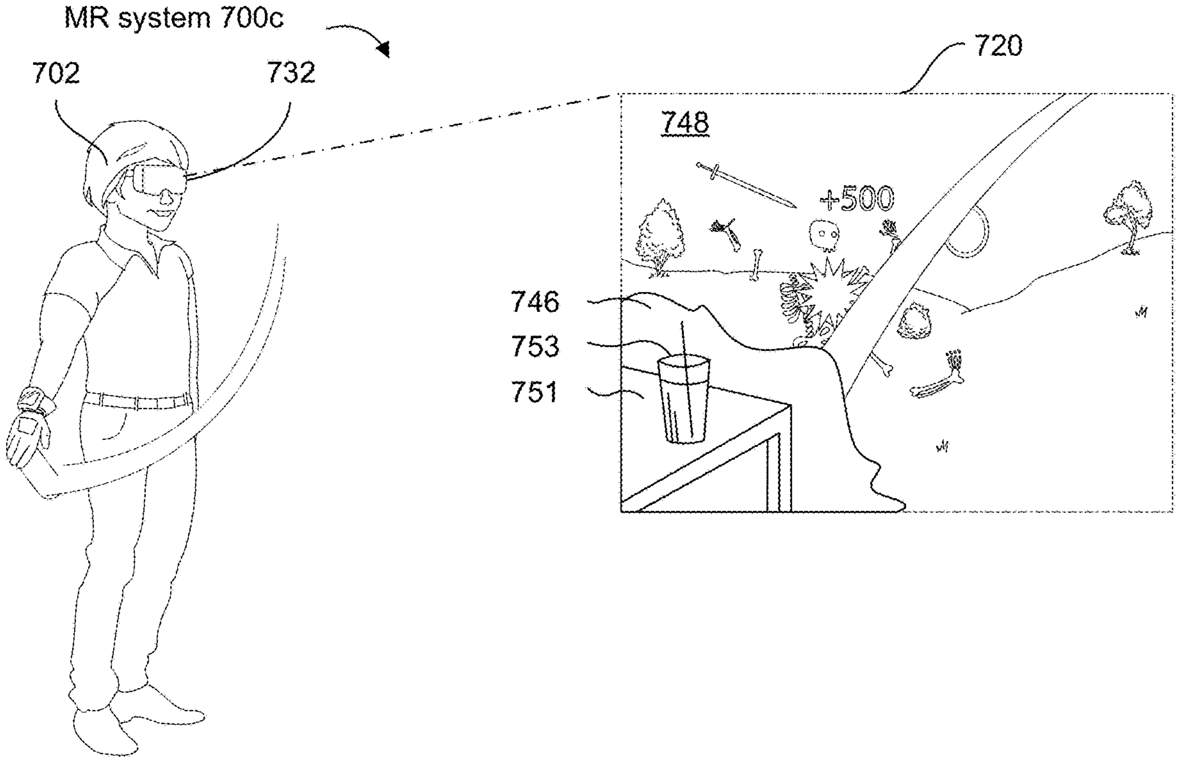

FIGS. 7A 7B, 7C-1, and 7C-2, illustrate example XR systems that include AR and MR systems, in accordance with some embodiments. FIG. 7A shows a first XR system 700*a* and first example user interactions using a wrist-wearable device 726, a head-wearable device (e.g., AR device 728), and/or a HIPD 742. FIG. 7B shows a second XR system 700*b* and second example user interactions using a wrist-wearable device 726, AR device 728, and/or an HIPD 742. FIGS. 7C-1 and 7C-2 show a third MR system 700*c* and third example user interactions using a wrist-wearable device 726, a head-wearable device (e.g., an MR device such as a VR device), and/or an HIPD 742. As the skilled artisan will appreciate upon reading the descriptions provided herein, the above-example AR and MR systems (described in detail below) can perform various functions and/or operations.

The wrist-wearable device 726, the head-wearable devices, and/or the HIPD 742 can communicatively couple via a network 725 (e.g., cellular, near field, Wi-Fi, personal area network, wireless LAN). Additionally, the wrist-wearable device 726, the head-wearable device, and/or the HIPD 742 can also communicatively couple with one or more servers 730, computers 740 (e.g., laptops, computers), mobile devices 750 (e.g., smartphones, tablets), and/or other electronic devices via the network 725 (e.g., cellular, near field, Wi-Fi, personal area network, wireless LAN). Similarly, a smart textile-based garment, when used, can also communicatively couple with the wrist-wearable device 726, the head-wearable device(s), the HIPD 742, the one or more servers 730, the computers 740, the mobile devices 750, and/or other electronic devices via the network 725 to provide inputs.

Turning to FIG. 7A, a user 702 is shown wearing the wrist-wearable device 726 and the AR device 728 and having the HIPD 742 on their desk. The wrist-wearable device 726, the AR device 728, and the HIPD 742 facilitate user interaction with an AR environment. In particular, as shown by the first AR system 700*a*, the wrist-wearable device 726, the AR device 728, and/or the HIPD 742 cause presentation of one or more avatars 704, digital representations of contacts 706, and virtual objects 708. As discussed below, the user 702 can interact with the one or more avatars 704, digital representations of the contacts 706, and virtual objects 708 via the wrist-wearable device 726, the AR device 728, and/or the HIPD 742. In addition, the user 702 is also able to directly view physical objects in the environment, such as a physical table 729, through transparent lens(es) and waveguide(s) of the AR device 728. Alternatively, an MR device could be used in place of the AR device 728 and a similar user experience can take place, but the user would not be directly viewing physical objects in the environment, such as table 729, and would instead be presented with a virtual reconstruction of the table 729 produced from one or more sensors of the MR device (e.g., an outward facing camera capable of recording the surrounding environment).

The user 702 can use any of the wrist-wearable device 726, the AR device 728 (e.g., through physical inputs at the AR device and/or built-in motion tracking of a user's extremities), a smart-textile garment, externally mounted extremity tracking device, the HIPD 742 to provide user inputs, etc. For example, the user 702 can perform one or more hand gestures that are detected by the wrist-wearable device 726 (e.g., using one or more EMG sensors and/or IMUs built into the wrist-wearable device) and/or AR device 728 (e.g., using one or more image sensors or cameras) to provide a user input. Alternatively, or additionally, the user 702 can provide a user input via one or more touch surfaces of the wrist-wearable device 726, the AR device 728, and/or the HIPD 742, and/or voice commands captured by a microphone of the wrist-wearable device 726, the AR device 728, and/or the HIPD 742. The wrist-wearable device 726, the AR device 728, and/or the HIPD 742 include an artificially intelligent digital assistant to help the user in providing a user input (e.g., completing a sequence of operations, suggesting different operations or commands, providing reminders, confirming a command). For example, the digital assistant can be invoked through an input occurring at the AR device 728 (e.g., via an input at a temple arm of the AR device 728). In some embodiments, the user 702 can provide a user input via one or more facial gestures and/or facial expressions. For example, cameras of the wrist-wearable device 726, the AR device 728, and/or the HIPD 742 can track the user 702's eyes for navigating a user interface.

The wrist-wearable device 726, the AR device 728, and/or the HIPD 742 can operate alone or in conjunction to allow the user 702 to interact with the AR environment. In some embodiments, the HIPD 742 is configured to operate as a central hub or control center for the wrist-wearable device 726, the AR device 728, and/or another communicatively coupled device. For example, the user 702 can provide an input to interact with the AR environment at any of the wrist-wearable device 726, the AR device 728, and/or the HIPD 742, and the HIPD 742 can identify one or more back-end and front-end tasks to cause the performance of the requested interaction and distribute instructions to cause the performance of the one or more back-end and front-end tasks at the wrist-wearable device 726, the AR device 728, and/or the HIPD 742. In some embodiments, a back-end task is a background-processing task that is not perceptible by the user (e.g., rendering content, decompression, compression, application-specific operations), and a front-end task is a user-facing task that is perceptible to the user (e.g., presenting information to the user, providing feedback to the user). The HIPD 742 can perform the back-end tasks and provide the wrist-wearable device 726 and/or the AR device 728 operational data corresponding to the performed back-end tasks such that the wrist-wearable device 726 and/or the AR device 728 can perform the front-end tasks. In this way, the HIPD 742, which has more computational resources and greater thermal headroom than the wrist-wearable device 726 and/or the AR device 728, performs computationally intensive tasks and reduces the computer resource utilization and/or power usage of the wrist-wearable device 726 and/or the AR device 728.

In the example shown by the first AR system 700*a*, the HIPD 742 identifies one or more back-end tasks and front-end tasks associated with a user request to initiate an AR video call with one or more other users (represented by the avatar 704 and the digital representation of the contact 706) and distributes instructions to cause the performance of the one or more back-end tasks and front-end tasks. In particular, the HIPD 742 performs back-end tasks for processing and/or rendering image data (and other data) associated with the AR video call and provides operational data associated with the performed back-end tasks to the AR device 728 such that the AR device 728 performs front-end tasks for presenting the AR video call (e.g., presenting the avatar 704 and the digital representation of the contact 706).

In some embodiments, the HIPD 742 can operate as a focal or anchor point for causing the presentation of information. This allows the user 702 to be generally aware of where information is presented. For example, as shown in the first AR system 700*a*, the avatar 704 and the digital representation of the contact 706 are presented above the HIPD 742. In particular, the HIPD 742 and the AR device 728 operate in conjunction to determine a location for presenting the avatar 704 and the digital representation of the contact 706. In some embodiments, information can be presented within a predetermined distance from the HIPD 742 (e.g., within five meters). For example, as shown in the first AR system 700*a*, virtual object 708 is presented on the desk some distance from the HIPD 742. Similar to the above example, the HIPD 742 and the AR device 728 can operate in conjunction to determine a location for presenting the virtual object 708. Alternatively, in some embodiments, presentation of information is not bound by the HIPD 742. More specifically, the avatar 704, the digital representation of the contact 706, and the virtual object 708 do not have to be presented within a predetermined distance of the HIPD 742. While an AR device 728 is described working with an HIPD, an MR headset can be interacted with in the same way as the AR device 728.

User inputs provided at the wrist-wearable device 726, the AR device 728, and/or the HIPD 742 are coordinated such that the user can use any device to initiate, continue, and/or complete an operation. For example, the user 702 can provide a user input to the AR device 728 to cause the AR device 728 to present the virtual object 708 and, while the virtual object 708 is presented by the AR device 728, the user 702 can provide one or more hand gestures via the wrist-wearable device 726 to interact and/or manipulate the virtual object 708. While an AR device 728 is described working with a wrist-wearable device 726, an MR headset can be interacted with in the same way as the AR device 728.

Integration of Artificial Intelligence with XR Systems

FIG. 7A illustrates an interaction in which an artificially intelligent virtual assistant can assist in requests made by a user 702. The AI virtual assistant can be used to complete open-ended requests made through natural language inputs by a user 702. For example, in FIG. 7A the user 702 makes an audible request 744 to summarize the conversation and then share the summarized conversation with others in the meeting. In addition, the AI virtual assistant is configured to use sensors of the XR system (e.g., cameras of an XR headset, microphones, and various other sensors of any of the devices in the system) to provide contextual prompts to the user for initiating tasks.

FIG. 7A also illustrates an example neural network 752 used in Artificial Intelligence applications. Uses of Artificial Intelligence (AI) are varied and encompass many different aspects of the devices and systems described herein. AI capabilities cover a diverse range of applications and deepen interactions between the user 702 and user devices (e.g., the AR device 728, an MR device 732, the HIPD 742, the wrist-wearable device 726). The AI discussed herein can be derived using many different training techniques. While the primary AI model example discussed herein is a neural network, other AI models can be used. Non-limiting examples of AI models include artificial neural networks (ANNs), deep neural networks (DNNs), convolution neural networks (CNNs), recurrent neural networks (RNNs), large language models (LLMs), long short-term memory networks, transformer models, decision trees, random forests, support vector machines, k-nearest neighbors, genetic algorithms, Markov models, Bayesian networks, fuzzy logic systems, and deep reinforcement learnings, etc. The AI models can be implemented at one or more of the user devices, and/or any other devices described herein. For devices and systems herein that employ multiple AI models, different models can be used depending on the task. For example, for a natural-language artificially intelligent virtual assistant, an LLM can be used and for the object detection of a physical environment, a DNN can be used instead.

In another example, an AI virtual assistant can include many different AI models and based on the user's request, multiple AI models may be employed (concurrently, sequentially or a combination thereof). For example, an LLM-based AI model can provide instructions for helping a user follow a recipe and the instructions can be based in part on another AI model that is derived from an ANN, a DNN, an RNN, etc. that is capable of discerning what part of the recipe the user is on (e.g., object and scene detection).

As AI training models evolve, the operations and experiences described herein could potentially be performed with different models other than those listed above, and a person skilled in the art would understand that the list above is non-limiting.

A user 702 can interact with an AI model through natural language inputs captured by a voice sensor, text inputs, or any other input modality that accepts natural language and/or a corresponding voice sensor module. In another instance, input is provided by tracking the eye gaze of a user 702 via a gaze tracker module. Additionally, the AI model can also receive inputs beyond those supplied by a user 702. For example, the AI can generate its response further based on environmental inputs (e.g., temperature data, image data, video data, ambient light data, audio data, GPS location data, inertial measurement (i.e., user motion) data, pattern recognition data, magnetometer data, depth data, pressure data, force data, neuromuscular data, heart rate data, temperature data, sleep data) captured in response to a user request by various types of sensors and/or their corresponding sensor modules. The sensors' data can be retrieved entirely from a single device (e.g., AR device 728) or from multiple devices that are in communication with each other (e.g., a system that includes at least two of an AR device 728, an MR device 732, the HIPD 742, the wrist-wearable device 726, etc.). The AI model can also access additional information (e.g., one or more servers 730, the computers 740, the mobile devices 750, and/or other electronic devices) via a network 725.

A non-limiting list of AI-enhanced functions includes but is not limited to image recognition, speech recognition (e.g., automatic speech recognition), text recognition (e.g., scene text recognition), pattern recognition, natural language processing and understanding, classification, regression, clustering, anomaly detection, sequence generation, content generation, and optimization. In some embodiments, AI-enhanced functions are fully or partially executed on cloud-computing platforms communicatively coupled to the user devices (e.g., the AR device 728, an MR device 732, the HIPD 742, the wrist-wearable device 726) via the one or more networks. The cloud-computing platforms provide scalable computing resources, distributed computing, managed AI services, interference acceleration, pre-trained models, APIs and/or other resources to support comprehensive computations required by the AI-enhanced function.

Example outputs stemming from the use of an AI model can include natural language responses, mathematical calculations, charts displaying information, audio, images, videos, texts, summaries of meetings, predictive operations based on environmental factors, classifications, pattern recognitions, recommendations, assessments, or other operations. In some embodiments, the generated outputs are stored on local memories of the user devices (e.g., the AR device 728, an MR device 732, the HIPD 742, the wrist-wearable device 726), storage options of the external devices (servers, computers, mobile devices, etc.), and/or storage options of the cloud-computing platforms.

The AI-based outputs can be presented across different modalities (e.g., audio-based, visual-based, haptic-based, and any combination thereof) and across different devices of the XR system described herein. Some visual-based outputs can include the displaying of information on XR augments of an XR headset, user interfaces displayed at a wrist-wearable device, laptop device, mobile device, etc. On devices with or without displays (e.g., HIPD 742), haptic feedback can provide information to the user 702. An AI model can also use the inputs described above to determine the appropriate modality and device(s) to present content to the user (e.g., a user walking on a busy road can be presented with an audio output instead of a visual output to avoid distracting the user 702).

Example Augmented Reality Interaction

FIG. 7B shows the user 702 wearing the wrist-wearable device 726 and the AR device 728 and holding the HIPD 742. In the second AR system **700*b*, the wrist-wearable device 726, the AR device 728, and/or the HIPD 742 are used to receive and/or provide one or more messages to a contact of the user 702. In particular, the wrist-wearable device 726, the AR device 728, and/or the HIPD 742** detect and coordinate one or more user inputs to initiate a messaging application and prepare a response to a received message via the messaging application.

In some embodiments, the user 702 initiates, via a user input, an application on the wrist-wearable device 726, the AR device 728, and/or the HIPD 742 that causes the application to initiate on at least one device. For example, in the second AR system **700*b* the user 702 performs a hand gesture associated with a command for initiating a messaging application (represented by messaging user interface 712); the wrist-wearable device 726 detects the hand gesture; and, based on a determination that the user 702 is wearing the AR device 728, causes the AR device 728 to present a messaging user interface 712 of the messaging application. The AR device 728 can present the messaging user interface 712 to the user 702 via its display (e.g., as shown by user 702's field of view 710). In some embodiments, the application is initiated and can be run on the device (e.g., the wrist-wearable device 726, the AR device 728, and/or the HIPD 742) that detects the user input to initiate the application, and the device provides another device operational data to cause the presentation of the messaging application. For example, the wrist-wearable device 726 can detect the user input to initiate a messaging application, initiate and run the messaging application, and provide operational data to the AR device 728 and/or the HIPD 742 to cause presentation of the messaging application. Alternatively, the application can be initiated and run at a device other than the device that detected the user input. For example, the wrist-wearable device 726 can detect the hand gesture associated with initiating the messaging application and cause the HIPD 742** to run the messaging application and coordinate the presentation of the messaging application.

Further, the user 702 can provide a user input provided at the wrist-wearable device 726, the AR device 728, and/or the HIPD 742 to continue and/or complete an operation initiated at another device. For example, after initiating the messaging application via the wrist-wearable device 726 and while the AR device 728 presents the messaging user interface 712, the user 702 can provide an input at the HIPD 742 to prepare a response (e.g., shown by the swipe gesture performed on the HIPD 742). The user 702's gestures performed on the HIPD 742 can be provided and/or displayed on another device. For example, the user 702's swipe gestures performed on the HIPD 742 are displayed on a virtual keyboard of the messaging user interface 712 displayed by the AR device 728.

In some embodiments, the wrist-wearable device 726, the AR device 728, the HIPD 742, and/or other communicatively coupled devices can present one or more notifications to the user 702. The notification can be an indication of a new message, an incoming call, an application update, a status update, etc. The user 702 can select the notification via the wrist-wearable device 726, the AR device 728, or the HIPD 742 and cause presentation of an application or operation associated with the notification on at least one device. For example, the user 702 can receive a notification that a message was received at the wrist-wearable device 726, the AR device 728, the HIPD 742, and/or other communicatively coupled device and provide a user input at the wrist-wearable device 726, the AR device 728, and/or the HIPD 742 to review the notification, and the device detecting the user input can cause an application associated with the notification to be initiated and/or presented at the wrist-wearable device 726, the AR device 728, and/or the HIPD 742.

While the above example describes coordinated inputs used to interact with a messaging application, the skilled artisan will appreciate upon reading the descriptions that user inputs can be coordinated to interact with any number of applications including, but not limited to, gaming applications, social media applications, camera applications, web-based applications, financial applications, etc. For example, the AR device 728 can present to the user 702 game application data and the HIPD 742 can use a controller to provide inputs to the game. Similarly, the user 702 can use the wrist-wearable device 726 to initiate a camera of the AR device 728, and the user can use the wrist-wearable device 726, the AR device 728, and/or the HIPD 742 to manipulate the image capture (e.g., zoom in or out, apply filters) and capture image data.

While an AR device 728 is shown being capable of certain functions, it is understood that an AR device can be an AR device with varying functionalities based on costs and market demands. For example, an AR device may include a single output modality such as an audio output modality. In another example, the AR device may include a low-fidelity display as one of the output modalities, where simple information (e.g., text and/or low-fidelity images/video) is capable of being presented to the user. In yet another example, the AR device can be configured with face-facing light emitting diodes (LEDs) configured to provide a user with information, e.g., an LED around the right-side lens can illuminate to notify the wearer to turn right while directions are being provided or an LED on the left-side can illuminate to notify the wearer to turn left while directions are being provided. In another embodiment, the AR device can include an outward-facing projector such that information (e.g., text information, media) may be displayed on the palm of a user's hand or other suitable surface (e.g., a table, whiteboard). In yet another embodiment, information may also be provided by locally dimming portions of a lens to emphasize portions of the environment in which the user's attention should be directed. Some AR devices can present AR augments either monocularly or binocularly (e.g., an AR augment can be presented at only a single display associated with a single lens as opposed presenting an AR augmented at both lenses to produce a binocular image). In some instances an AR device capable of presenting AR augments binocularly can optionally display AR augments monocularly as well (e.g., for power-saving purposes or other presentation considerations). These examples are non-exhaustive and features of one AR device described above can be combined with features of another AR device described above. While features and experiences of an AR device have been described generally in the preceding sections, it is understood that the described functionalities and experiences can be applied in a similar manner to an MR headset, which is described below in the proceeding sections.

Example Mixed Reality Interaction

Turning to FIGS. 7C-1 and 7C-2, the user 702 is shown wearing the wrist-wearable device 726 and an MR device 732 (e.g., a device capable of providing either an entirely VR experience or an MR experience that displays object(s) from a physical environment at a display of the device) and holding the HIPD 742. In the third AR system 700*c*, the wrist-wearable device 726, the MR device 732, and/or the HIPD 742 are used to interact within an MR environment, such as a VR game or other MR/VR application. While the MR device 732 presents a representation of a VR game (e.g., first MR game environment 720) to the user 702, the wrist-wearable device 726, the MR device 732, and/or the HIPD 742 detect and coordinate one or more user inputs to allow the user 702 to interact with the VR game.

In some embodiments, the user 702 can provide a user input via the wrist-wearable device 726, the MR device 732, and/or the HIPD 742 that causes an action in a corresponding MR environment. For example, the user 702 in the third MR system 700*c* (shown in FIG. 7C-1) raises the HIPD 742 to prepare for a swing in the first MR game environment 720. The MR device 732, responsive to the user 702 raising the HIPD 742, causes the MR representation of the user 722 to perform a similar action (e.g., raise a virtual object, such as a virtual sword 724). In some embodiments, each device uses respective sensor data and/or image data to detect the user input and provide an accurate representation of the user 702's motion. For example, image sensors (e.g., SLAM cameras or other cameras) of the HIPD 742 can be used to detect a position of the HIPD 742 relative to the user 702's body such that the virtual object can be positioned appropriately within the first MR game environment 720; sensor data from the wrist-wearable device 726 can be used to detect a velocity at which the user 702 raises the HIPD 742 such that the MR representation of the user 722 and the virtual sword 724 are synchronized with the user 702's movements; and image sensors of the MR device 732 can be used to represent the user 702's body, boundary conditions, or real-world objects within the first MR game environment 720.

In FIG. 7C-2, the user 702 performs a downward swing while holding the HIPD 742. The user 702's downward swing is detected by the wrist-wearable device 726, the MR device 732, and/or the HIPD 742 and a corresponding action is performed in the first MR game environment 720. In some embodiments, the data captured by each device is used to improve the user's experience within the MR environment. For example, sensor data of the wrist-wearable device 726 can be used to determine a speed and/or force at which the downward swing is performed and image sensors of the HIPD 742 and/or the MR device 732 can be used to determine a location of the swing and how it should be represented in the first MR game environment 720, which, in turn, can be used as inputs for the MR environment (e.g., game mechanics, which can use detected speed, force, locations, and/or aspects of the user 702's actions to classify a user's inputs (e.g., user performs a light strike, hard strike, critical strike, glancing strike, miss) or calculate an output (e.g., amount of damage)).

FIG. 7C-2 further illustrates that a portion of the physical environment is reconstructed and displayed at a display of the MR device 732 while the MR game environment 720 is being displayed. In this instance, a reconstruction of the physical environment 746 is displayed in place of a portion of the MR game environment 720 when object(s) in the physical environment are potentially in the path of the user (e.g., a collision with the user and an object in the physical environment are likely). Thus, this example MR game environment 720 includes (i) an immersive VR portion 748 (e.g., an environment that does not have a corollary counterpart in a nearby physical environment) and (ii) a reconstruction of the physical environment 746 (e.g., table 751 and cup 753). While the example shown here is an MR environment that shows a reconstruction of the physical environment to avoid collisions, other uses of reconstructions of the physical environment can be used, such as defining features of the virtual environment based on the surrounding physical environment (e.g., a virtual column can be placed based on an object in the surrounding physical environment (e.g., a tree)).

While the wrist-wearable device 726, the MR device 732, and/or the HIPD 742 are described as detecting user inputs, in some embodiments, user inputs are detected at a single device (with the single device being responsible for distributing signals to the other devices for performing the user input). For example, the HIPD 742 can operate an application for generating the first MR game environment 720 and provide the MR device 732 with corresponding data for causing the presentation of the first MR game environment 720, as well as detect the user 702's movements (while holding the HIPD 742) to cause the performance of corresponding actions within the first MR game environment 720. Additionally or alternatively, in some embodiments, operational data (e.g., sensor data, image data, application data, device data, and/or other data) of one or more devices is provided to a single device (e.g., the HIPD 742) to process the operational data and cause respective devices to perform an action associated with processed operational data.

In some embodiments, the user 702 can wear a wrist-wearable device 726, wear an MR device 732, wear smart textile-based garments 738 (e.g., wearable haptic gloves), and/or hold an HIPD 742 device. In this embodiment, the wrist-wearable device 726, the MR device 732, and/or the smart textile-based garments 738 are used to interact within an MR environment (e.g., any AR or MR system described above in reference to FIGS. 7A-7B). While the MR device 732 presents a representation of an MR game (e.g., second MR game environment 720) to the user 702, the wrist-wearable device 726, the MR device 732, and/or the smart textile-based garments 738 detect and coordinate one or more user inputs to allow the user 702 to interact with the MR environment.

In some embodiments, the user 702 can provide a user input via the wrist-wearable device 726, an HIPD 742, the MR device 732, and/or the smart textile-based garments 738 that causes an action in a corresponding MR environment. In some embodiments, each device uses respective sensor data and/or image data to detect the user input and provide an accurate representation of the user 702's motion. While four different input devices are shown (e.g., a wrist-wearable device 726, an MR device 732, an HIPD 742, and a smart textile-based garment 738) each one of these input devices entirely on its own can provide inputs for fully interacting with the MR environment. For example, the wrist-wearable device can provide sufficient inputs on its own for interacting with the MR environment. In some embodiments, if multiple input devices are used (e.g., a wrist-wearable device and the smart textile-based garment 738) sensor fusion can be utilized to ensure inputs are correct. While multiple input devices are described, it is understood that other input devices can be used in conjunction or on their own instead, such as but not limited to external motion-tracking cameras, other wearable devices fitted to different parts of a user, apparatuses that allow for a user to experience walking in an MR environment while remaining substantially stationary in the physical environment, etc.

As described above, the data captured by each device is used to improve the user's experience within the MR environment. Although not shown, the smart textile-based garments 738 can be used in conjunction with an MR device and/or an HIPD 742.

While some experiences are described as occurring on an AR device and other experiences are described as occurring on an MR device, one skilled in the art would appreciate that experiences can be ported over from an MR device to an AR device, and vice versa.

Some definitions of devices and components that can be included in some or all of the example devices discussed are defined here for ease of reference. A skilled artisan will appreciate that certain types of the components described may be more suitable for a particular set of devices, and less suitable for a different set of devices. But subsequent reference to the components defined here should be considered to be encompassed by the definitions provided.

In some embodiments example devices and systems, including electronic devices and systems, will be discussed. Such example devices and systems are not intended to be limiting, and one of skill in the art will understand that alternative devices and systems to the example devices and systems described herein may be used to perform the operations and construct the systems and devices that are described herein.

As described herein, an electronic device is a device that uses electrical energy to perform a specific function. It can be any physical object that contains electronic components such as transistors, resistors, capacitors, diodes, and integrated circuits. Examples of electronic devices include smartphones, laptops, digital cameras, televisions, gaming consoles, and music players, as well as the example electronic devices discussed herein. As described herein, an intermediary electronic device is a device that sits between two other electronic devices, and/or a subset of components of one or more electronic devices and facilitates communication, and/or data processing and/or data transfer between the respective electronic devices and/or electronic components.

The foregoing descriptions of FIGS. 7A-7C-2 provided above are intended to augment the description provided in reference to FIGS. 1-6. While terms in the following description may not be identical to terms used in the foregoing description, a person having ordinary skill in the art would understand these terms to have the same meaning.

Any data collection performed by the devices described herein and/or any devices configured to perform or cause the performance of the different embodiments described above in reference to any of the Figures, hereinafter the "devices," is done with user consent and in a manner that is consistent with all applicable privacy laws. Users are given options to allow the devices to collect data, as well as the option to limit or deny collection of data by the devices. A user is able to opt in or opt out of any data collection at any time. Further, users are given the option to request the removal of any collected data.

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A non-transitory computer readable storage medium including instructions that, when executed by a computing device, cause the computing device to:

receive, via a first sensor of a shared sensor set, first data representative of visual intent;

receive, via a second sensor of the shared sensor set, second data representative of a hand input;

determine, using a contrastively-trained model, third data that describes a relationship between the first data and the second data;

determine, using a task-inferring model and the third data, a task to be performed at an extended-reality (XR) system including the computing device; and provide instructions for causing performance of the task at the XR system.

2. The non-transitory computer readable storage medium of claim 1, wherein the contrastively-trained model includes:

a first encoder configured to receive the first data; and a second encoder configured to receive the second data, wherein respective outputs of the first encoder and the second encoder are used to determine the third data.

3. The non-transitory computer readable storage medium of claim 1, wherein the task-inferring model includes at least two linear models, each linear model configured to determine a respective task to be performed at the XR system.

4. The non-transitory computer readable storage medium of claim 1, wherein the task includes one or more of gesture recognition, input disambiguation, gaze and user input coordination, and goal-oriented movement detection.

5. The non-transitory computer readable storage medium of claim 1, wherein the task includes sensor drift detection.

6. The non-transitory computer readable storage medium of claim 1, wherein the instructions, when executed by the computing device, further cause the computing device to:

in accordance with a determination that the first data or the second data are below a predetermined accuracy threshold:

determine, based on previously received first data or second data, replacement data; and determine, using the contrastively-trained model, fourth data that describes a relationship between the first data or the second data and the replacement data, wherein the fourth data replaces the third data.

7. The non-transitory computer readable storage medium of claim 1, wherein the shared sensor set includes one or more of:

a first sensor of an extended-reality (XR) head-wearable device; and a second sensor of the extended-reality (XR) head-wearable device.

8. The non-transitory computer readable storage medium of claim 7, wherein:

the first sensor of the shared sensor set is a first imaging device of the XR head-wearable device configured to track eyes of a user; and the second sensor of the shared sensor set is a second imaging device of the XR head-wearable device configured to track hands of a user.

9. The non-transitory computer readable storage medium of claim 1, wherein the shared sensor set includes one or more of:

one or more sensors of an extended-reality (XR) head-wearable device;

one or more sensors of a wearable device distinct from the XR head-wearable device; and one or more sensors of a controller.

10. The non-transitory computer readable storage medium of claim 9, wherein:

the first sensor of the shared sensor set is an imaging device of the XR head-wearable device configured to track eyes of a user; and the second sensor of the shared sensor set is a bipotential signal sensor of the wearable device.

11. A head-wearable device, comprising:

one or more input devices; and one or more programs, wherein the one or more programs are stored in memory and configured to be executed by one or more processors of the head-wearable device, the one or more programs including instructions for performing:

receiving, via a first sensor of a shared sensor set, first data representative of visual intent;

receiving, via a second sensor of the shared sensor set, second data representative of a hand input;

determining, using a contrastively-trained model, third data that describes a relationship between the first data and the second data;

determining, using a task-inferring model and the third data, a task to be performed at an extended-reality (XR) system including the head-wearable device; and providing instructions for causing performance of the task at the XR system.

12. The head-wearable device of claim 11, wherein the contrastively-trained model includes:

a first encoder configured to receive the first data; and a second encoder configured to receive the second data, wherein respective outputs of the first encoder and the second encoder are used to determine the third data.

13. The head-wearable device of claim 11, wherein the task-inferring model includes at least two linear models, each linear model configured to determine a respective task to be performed at the XR system.

14. The head-wearable device of claim 11, wherein the task includes one or more of gesture recognition, input disambiguation, gaze and user input coordination, and goal-oriented movement detection.

15. The head-wearable device of claim 11, wherein the task includes sensor drift detection.

16. The head-wearable device of claim 11, wherein the one or more programs further include instructions for performing:

in accordance with a determination that the first data or the second data are below a predetermined accuracy threshold:

determining, based on previously received first data or second data, replacement data; and determining, using the contrastively-trained model, fourth data that describes a relationship between the first data or the second data and the replacement data, wherein the fourth data replaces the third data.

17. The head-wearable device of claim 11, wherein the shared sensor set includes one or more of:

a first sensor of the head-wearable device; and a second sensor of the head-wearable device.

18. A method, comprising:

receiving, via a first sensor of a shared sensor set, first data representative of visual intent;

receiving, via a second sensor of the shared sensor set, second data representative of a hand input;

determining, using a contrastively-trained model, third data that describes a relationship between the first data and the second data;

determining, using a task-inferring model and the third data, a task to be performed at an extended-reality (XR) system; and providing instructions for causing performance of the task at the XR system.

19. The method of claim 18, wherein the contrastively-trained model includes:

a first encoder configured to receive the first data; and a second encoder configured to receive the second data, wherein respective outputs of the first encoder and the second encoder are used to determine the third data.

20. The method of claim 18, wherein the task inferring model includes at least two linear models, each linear model configured to determine a respective task to be performed at the XR system.

* * * * *